United States Patent [19]
Logan et al.

[11] 3,752,098
[45] Aug. 14, 1973

[54] METHOD AND APPARATUS FOR TRANSLATING AN ARTICLE AND A TOOL RELATIVE TO ONE ANOTHER

[75] Inventors: David J. Logan, Glastonbury; Heinz Joseph Gerber, West Hartford, both of Conn.

[73] Assignee: The Gerber Scientific Instrument Company, South Windsor, Conn.

[22] Filed: Apr. 5, 1971

[21] Appl. No.: 131,285

[52] U.S. Cl............................ 112/121.12, 318/571
[51] Int. Cl.............................................. D05b 21/00
[58] Field of Search................. 112/121.11, 121.12, 112/121.15, 121.29, 102, 204; 318/568, 569, 570, 571, 573, 574; 235/151.11; 346/29; 269/8

[56] References Cited
UNITED STATES PATENTS

| | | | |
|---|---|---|---|
| 3,083,580 | 4/1963 | Carson et al.............. | 112/121.11 X |
| 3,559,021 | 1/1971 | Bingham, Jr......................... | 318/568 |
| 3,416,056 | 12/1968 | Motooka et al. .................. | 318/573 |
| 3,515,962 | 6/1970 | Elbling............................... | 318/574 |
| 3,385,244 | 5/1968 | Ramsey et al. ................. | 112/121.12 |
| 3,208,414 | 9/1965 | Reeber et al. ................. | 112/121.12 |
| 3,349,731 | 10/1967 | Bono.............................. | 112/121.12 |
| 1,312,546 | 8/1919 | Karasick ........................... | 269/8 X |

Primary Examiner—James R. Boler
Attorney—McCormick, Paulding & Huber

[57] ABSTRACT

A method and apparatus are disclosed for moving relative to one another an article or workpiece and a tool which performs a cyclic operation on the workpiece so that the cyclic operation can be repeatedly carried out at different points on the workpiece. The apparatus and the method which comprehends the operation of the apparatus are particularly addressed to a numerically controlled sewing machine in which an article to be sewn and a reciprocating sewing needle are translated relative to one another according to a plurality of vector commands which individually define the direction and length of each sewing stitch and together define a desired path or seam along which the sewing stitches are formed. The article is supported on a translatable carriage and the movements of the carriage relative to the sewing needle are controlled by a pre-programmed memory tape. The memory tape is programmed with coded digital information defining the vector commands and other machine function commands and has the information defining the vector command for each stitch contained entirely within a single tape frame. The movements of the article and translatable carriage are executed in response to and in synchronism with the cyclic operation of the sewing needle and may occur during the phase of the cyclic operation in which the needle is withdrawn from the article being sewn.

25 Claims, 20 Drawing Figures

United States Patent [19]
Logan et al.
[11] 3,752,098
[45] Aug. 14, 1973
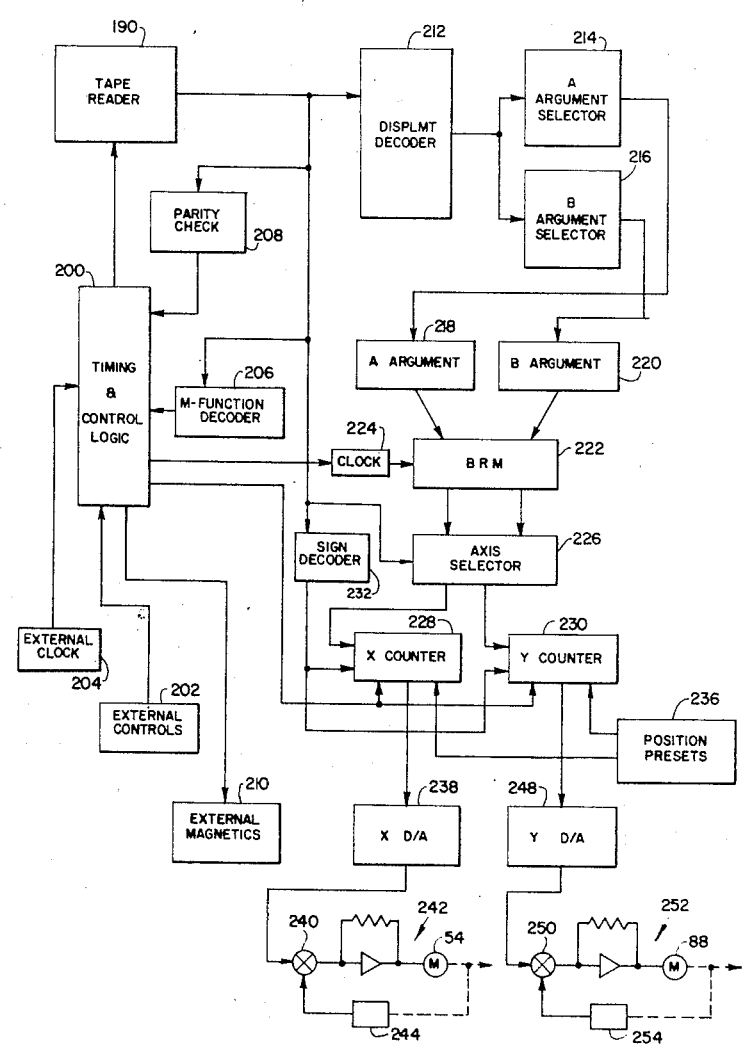

Patented Aug. 14, 1973

INVENTORS
DAVID J. LOGAN
HEINZ JOSEPH GERBER

BY McCormick, Paulding & Huber
ATTORNEYS

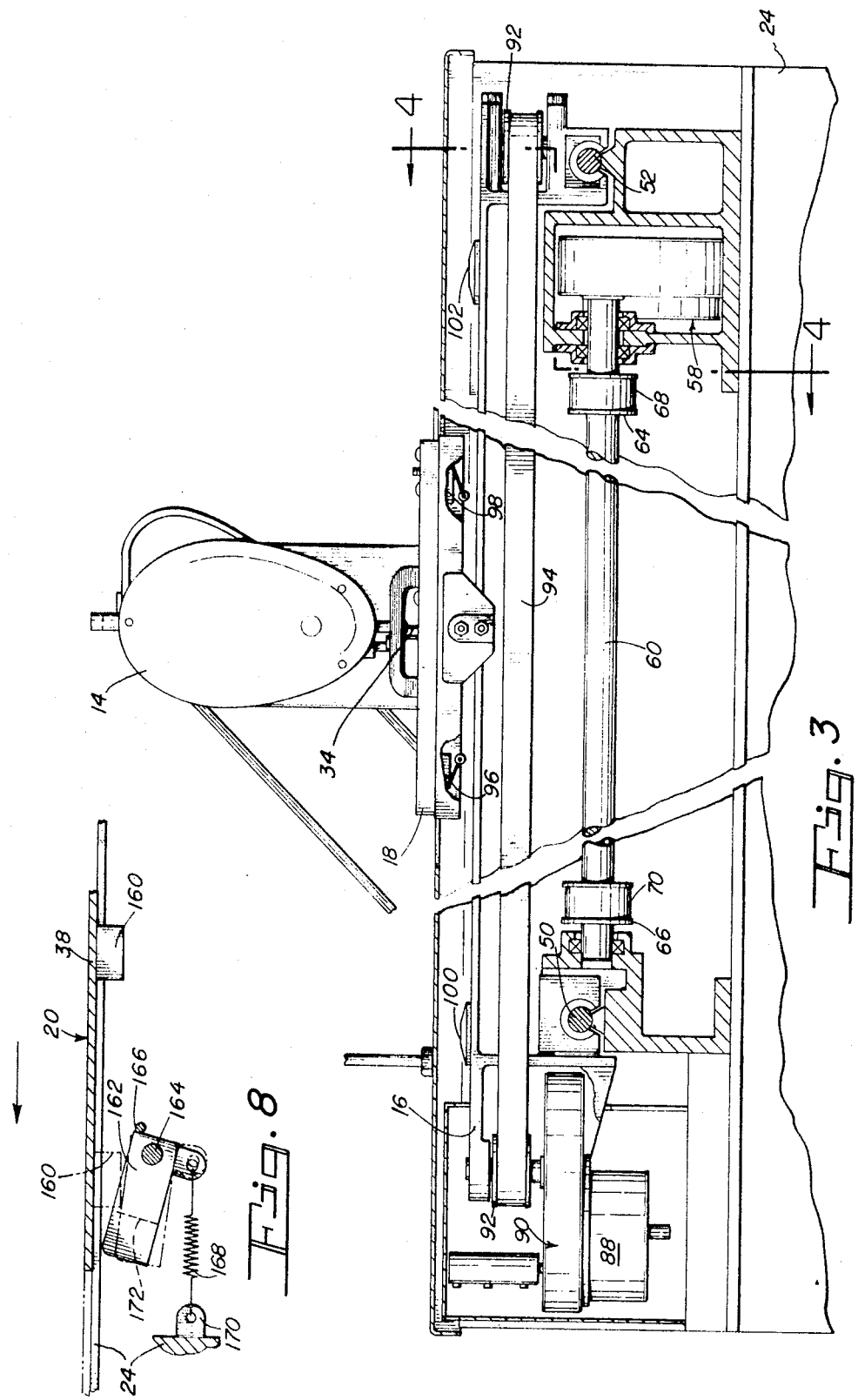

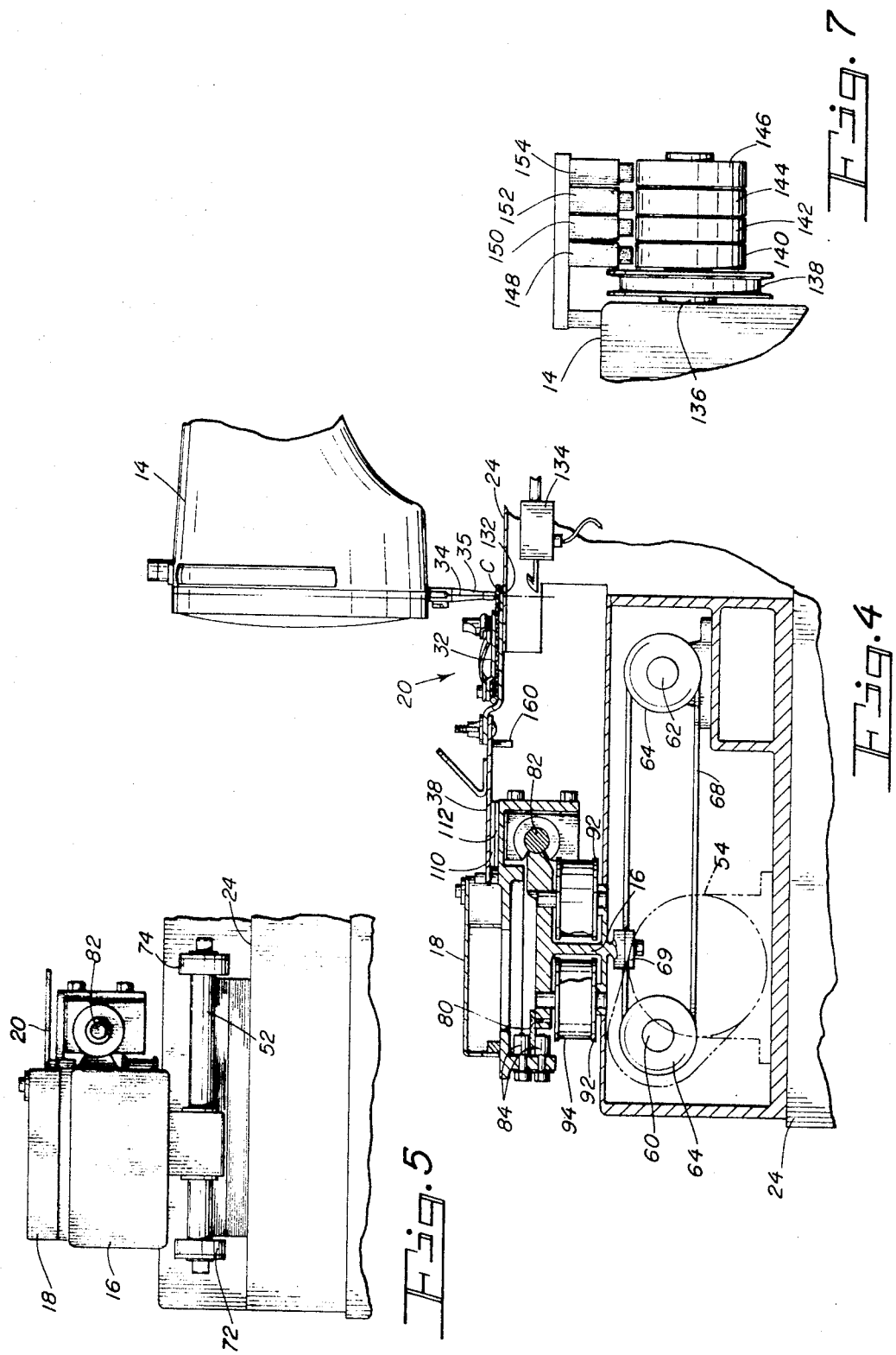

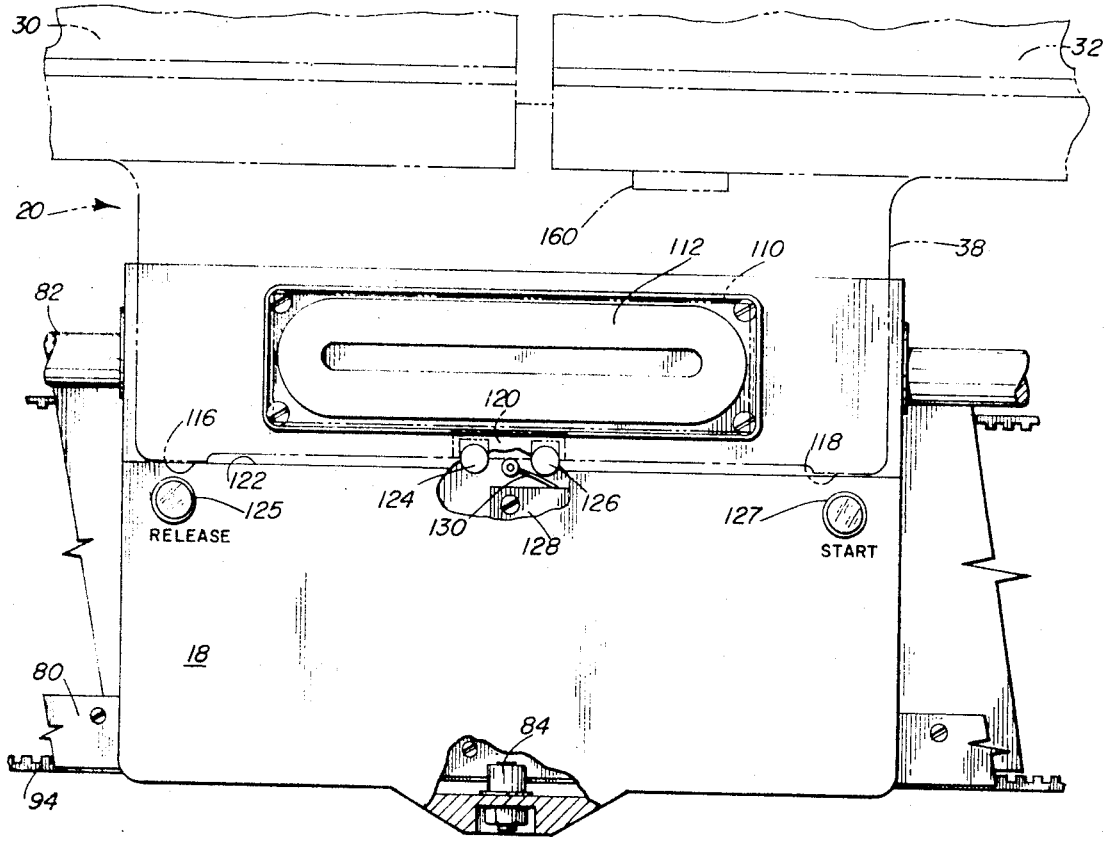
Fig. 6
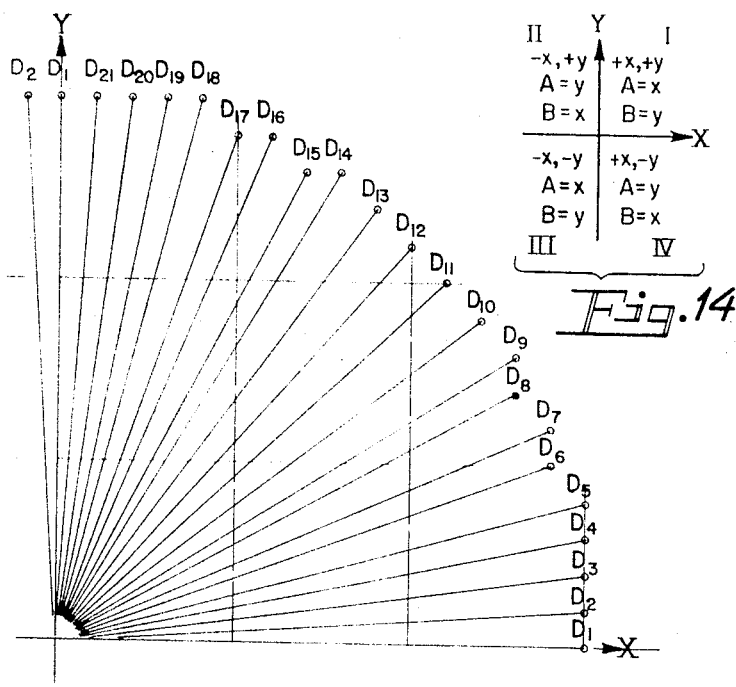
Fig. 12
| $D_n$ | A | B |
|---|---|---|
| $D_1$ | 15 | 0 |
| $D_2$ | 15 | 1 |
| $D_3$ | 15 | 2 |
| $D_4$ | 15 | 3 |
| $D_5$ | 15 | 4 |
| $D_6$ | 14 | 5 |
| $D_7$ | 14 | 6 |
| $D_8$ | 13 | 7 |
| $D_9$ | 13 | 8 |
| $D_{10}$ | 12 | 9 |
| $D_{11}$ | 11 | 10 |
| $D_{12}$ | 10 | 11 |
| $D_{13}$ | 9 | 12 |
| $D_{14}$ | 8 | 13 |
| $D_{15}$ | 7 | 13 |
| $D_{16}$ | 6 | 14 |
| $D_{17}$ | 5 | 14 |
| $D_{18}$ | 4 | 15 |
| $D_{19}$ | 3 | 15 |
| $D_{20}$ | 2 | 15 |
| $D_{21}$ | 1 | 15 |
Fig. 13
| | II | | I | |
|---|---|---|---|---|
| | $-x, +y$ | | $+x, +y$ | |
| | A = y | | A = x | |
| | B = x | | B = y | |
| | $-x, -y$ | | $+x, -y$ | |
| | A = x | | A = y | |
| | B = y | | B = x | |
| | III | | IV | |
Fig. 14

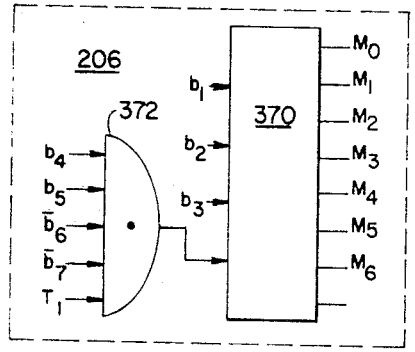
FIG. 16
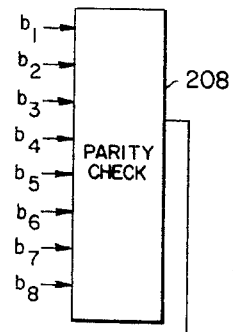
FIG. 11
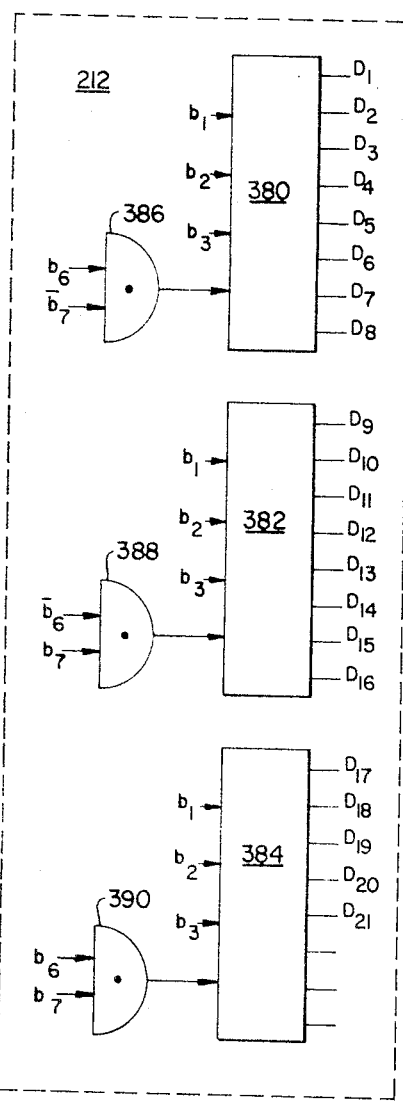
FIG. 17
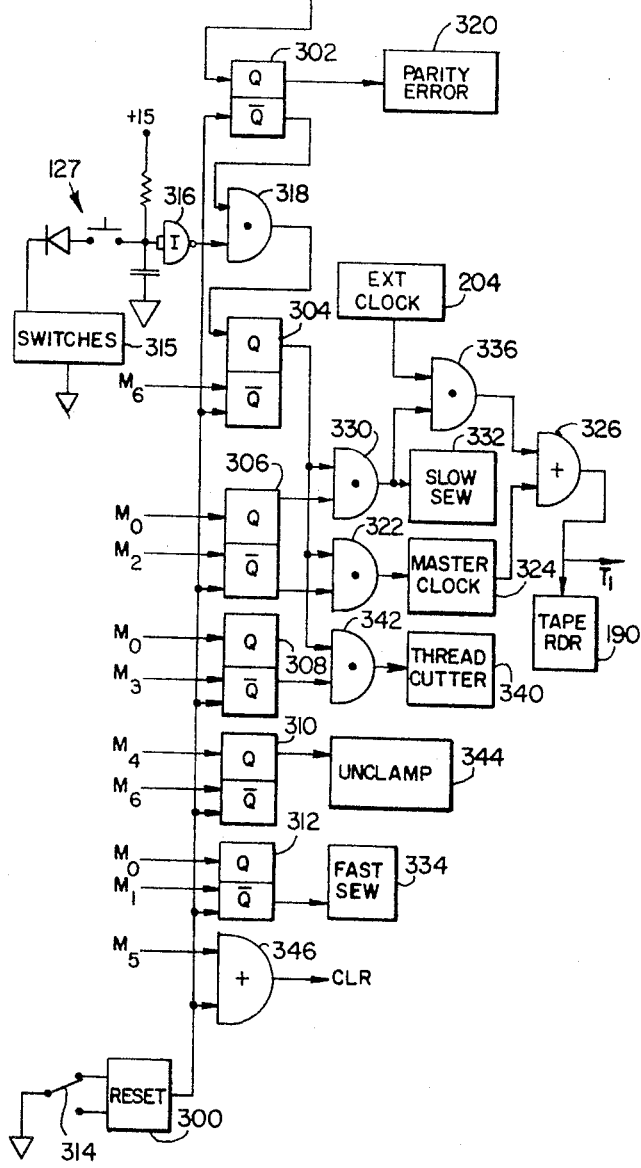

METHOD AND APPARATUS FOR TRANSLATING AN ARTICLE AND A TOOL RELATIVE TO ONE ANOTHER

BACKGROUND OF THE INVENTION

This invention relates to the field of numerical control systems which are utilized to accurately control the movements of an article and a tool relative to one another as the tool operates upon the article. In particular, the present invention is addressed to systems where the tool performs a cyclic operation on the article such as a stitching operation performed by a reciprocating needle along a stitch path over a layup of fabric materials to be sewn together.

In numerical control systems of the prior art, the general object of translating an article and a tool relative to one another to cause the tool to follow a desired line on the workpiece has generally included the generation of a program which defines the specific relative movements between a tool and the article worked on in terms of the absolute coordinates of a plurality of incrementally spaced workpoints in a basic two or three dimensional coordinate system or in terms of the components of each incremental displacement from one workpoint to the next in a given coordinate system. Once the program of displacements has been established in terms of either the absolute coordinates or the components of the movements from one workpoint to the next, the program is imposed on a memory device such as a memory tape which is read by a numercial control system to control a machine and reproduce the desired pattern or contour on the article. The information imposed on the tape may include machine function commands in addition to the commands for moving the article and tool relative to one another.

U. S. Pat. No. 3,069,608 discloses a numerically controlled system in which the commands imposed on a digital memory tape represent incremental motions from workpoint to workpoint in terms of the components of the motions along two or three coordinate axes. These commands taken sequentially define the movements of a controlled part of the machine and the workpiece relative to one another over a desired pattern on the workpiece. The components of the motions along each coordinate direction vary in length depending upon the resultant movements desired. The digital information defining one component is located in an associated track of the memory tape and extends longitudinally of the tape through a plurality of tape frames. In this respect, the term "tape frame" refers to the smallest length of tape which can accommodate one word bit of information. For example, in a multitrack punched tape, one frame corresponds to that segment of the tape which contains now row of holes extending laterally across the tape. It is readily understood that with the information defining the components distributed longitudinally along the tape in a plurality of tape frames, it is necessary to index the tape through the plurality of tape frames, or one tape block, to derive the information which completely defines any resultant movement. Such a distribution of the data may require expensive, high-speed tape readers, particularly where it is necessary to read the tape "on line" and execute the motions in a limited period of time.

One alternative to programming a digital memory tape as described in the above-referenced patent is disclosed in U. S. Pat. No. 3,199,111 in which the movement information is defined in terms of fixed-length, incremental components along selected coordinate axes. The digital information defining one component is completely defined within a single tape frame; however, a tape block composed of two or possibly three tape frames is required to completely define all components of a resultant movement and it is necessary to read a complete block of frames if the actual motions along each of the coordinate directions are to occur simultaneously. Furthermore, to maintain a reasonable degree of resolution with the components having a fixed length, it is necessary to select a unit length which is exceptionally small, that is, a length having an order of one one-hundredth inch or a length approximately equal to the degree of resolution desired, since the angular resolution afforded by the components is limited. With small, fixed length components, sizable movements between workpoints require the reading of many tape frames because the information in each frame represents a small portion or increment of the total movement.

It is desirable in many systems, particularly in systems where a tool performs a cyclic operation on an article, to provide relative movements between the article and tool within a portion of the operating cycle which may be relatively brief. For example, most commercial sewing machines now utilized are capable of operating at variable speeds and in a sewing operation which employs a reciprocating needle, it is preferably to move the article being sewn relative to the needle during that portion of the stitching cycle in which the needle is disengaged from the article. Sizable relative movements equal in length to a single stitch must occur during that time interval in which the needle is withdrawn and must always be accomplished during the same phase of the stitching cycle regardless of the speed of the sewing machine. A numerical control system utilizing a memory tape for controlling the movements of the article and needle relative to one another must read and process the digital information which completely defines a displacement necessary for a single stitch in a limited period of time and in synchronism with the stitching cycles. A system which possesses the inherent capability of providing such displacement information rapidly and synchronously is highly advantageous and therefore desirable.

SUMMARY OF THE INVENTION

The present invention resides in an apparatus and method for translating an object and a tool relative to one another to cause the tool to traverse a given path or pattern on the object. The apparatus is comprised principally of a first signal means which provides a first group of signals in sequential sets, such sets, for example, being digital signals, and each set being representative of a vector defining a movement of the object and tool relative to one another, the vectors being such that when taken sequentially in the order of the sets of signals, they define the given path to be traversed on the article by the tool; second signal means which is connected to the first signal means and is responsive to the first group of signals for providing a second group of signals in sequential sets, the sets of the second group corresponding with the respective sets of the first group provided by the first signal means and being respectively representative of the components of the vectors along selected coordinate directions; and means connected to the second signal means and responsive to the second group of signals in sequential sets for translating the object and tool relative to one another simultaneously in each of the coordinate directions according to the components of said vectors represented by the second group of signals so that the tool is caused to traverse the given path on the object. The first signal means includes signal generating means which produces from a memory tape vector command signals completely defining a segment of the path to be traversed on an object, signals representing one vector command being derived from a single tape frame. In one embodiment of the invention, the vectors define a stitch path to be followed on an article by a reciprocating needle of a sewing machine and each vector corresponds to the motion needed to index the sewed article by one stitch during one stitching cycle of the sewing machine. The generation of one set of command signals defining a vector is synchronized with the cyclic operation of the sewing machine needle by a timing signal generator. A memory tape containing digital information defining the vector commands is advanced one frame for each stitch by the timing signal.

BRIEF DESCRIPTION OF THE DRAWINGS

FIG. 3 is a front elevational view of the two-axis carriage mechanism of FIG. 1 for moving the part holder relative to the quick-stop sewing machine.

FIG. 4 is a vertical sectional view taken on the line 4—4 of FIG. 3.

FIG. 5 is a fragmentary end elevational view of the two-axis carriage mechanism of FIG. 1.

FIG. 6 is an enlarged fragmentary top view of the movable carriage and the part holder of FIG. 1 showing the clamping elements and control switches.

FIG. 7 is a fragmentary view of the quick-stop sewing machine of FIG. 1 showing the needle position pickups.

FIG. 8 is a fragmentary view of the latching mechanism for removing the part holder from the two-axis carriage mechanism of FIG. 1.

FIG. 11 is a diagram showing in more detail the logic system of the control computer of FIG. 9.

FIG. 12 is a diagram of the set of vector displacements made available in each quadrant and utilized by the apparatus of FIG. 1 to define the movements of the part holder and the sewing needle relative to one another in the plane of the workpiece.

FIG. 13 is a table showing the arguments of the vector displacements of FIG. 12.

FIG. 14 is a diagram of a standard Cartesian coordinate system showing the relationship of the arguments of the vector displacements of FIG. 13 with the coordinate axes and the signs of the components along the axes in each quadrant.

FIG. 16 is a diagram showing the detailed construction of the M-function decoder of FIG. 9.

FIG. 17 is a diagram showing the detailed construction of the displacement decoder of FIG. 9.

DESCRIPTION OF THE PREFERRED EMBODIMENTS

The present invention relates to an improved method and apparatus for translating a workpiece and a tool relative to one another to cause the tool to traverse a given path on the workpiece. While the invention has a wide range of applications, it is particularly useful in systems where the tool performs a cyclic operation on the workpiece, and the workpiece and tool are moved or indexed relative to one another during each operating cycle. The invention is ideally suited to a sewing apparatus in which a reciprocating needle generates stitches in a layer or layup of fabrics or other materials as the needle is caused to traverse a stitching path on the article. For this reason, the invention is disclosed herein as embodied in a numerically controlled sewing apparatus.

GENERAL ARRANGEMENT

Figure 1:
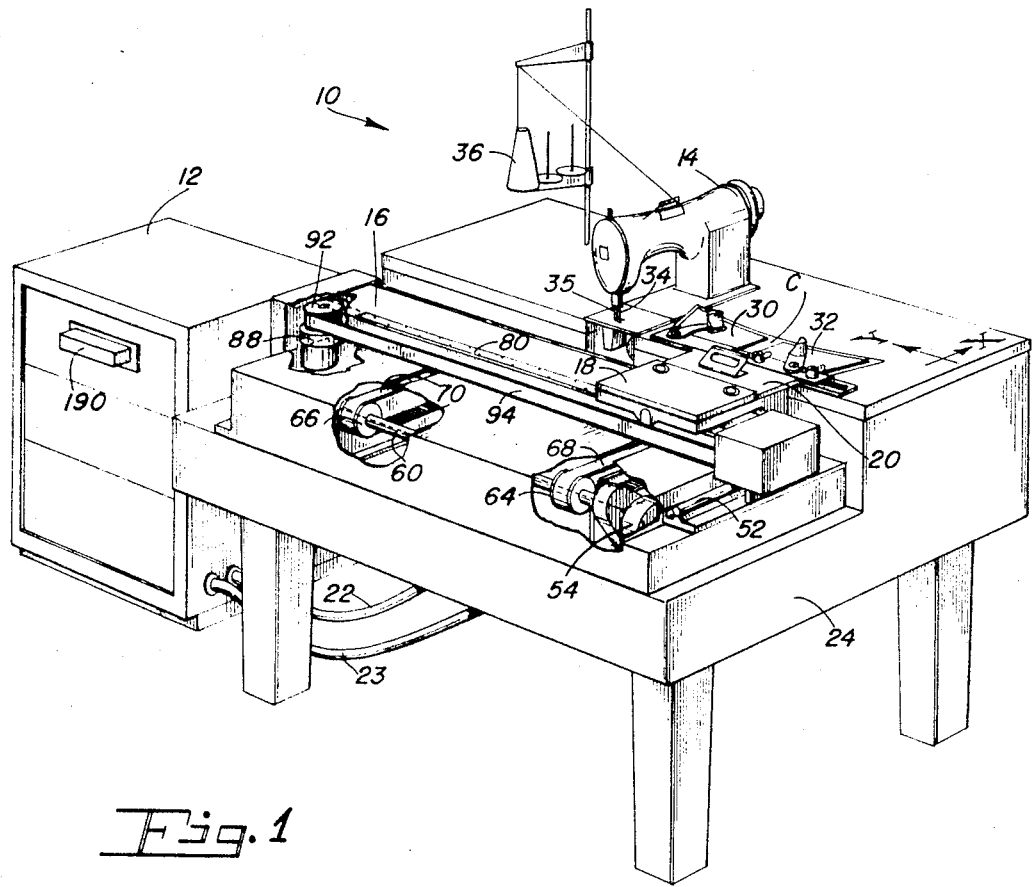
FIG. 1 is a perspective view of a numerically controlled sewing apparatus embodying the present invention.

FIG. 1 shows the principal components of a numerically controlled sewing system embodying the present invention in a perspective view. The principal components of the system, generally designated 10, include a control computer 12, a conventional, commercial type, quick-stop sewing machine 14, a two-axis carriage mechanism composed of an X carriage 16 movable in a direction parallel to the illustrated X axis and a Y carriage 18 mounted to the X carriage and movable in a direction parallel to the illustrated Y axis, and a part holder 20 which is translated relative to the sewing machine 14 by the carriages 16 and 18 under the control of the computer 12. The computer 12 is housed within a separate cabinet and is connected by means of a command signal cable 22 and a sensor signal cable 23 to other components including the movable carriages 16 and 18 and the sewing machine 14. The sewing machine 14 and the movable carriages 16 and 18 are mounted on a common support table 24.

Figure 2:
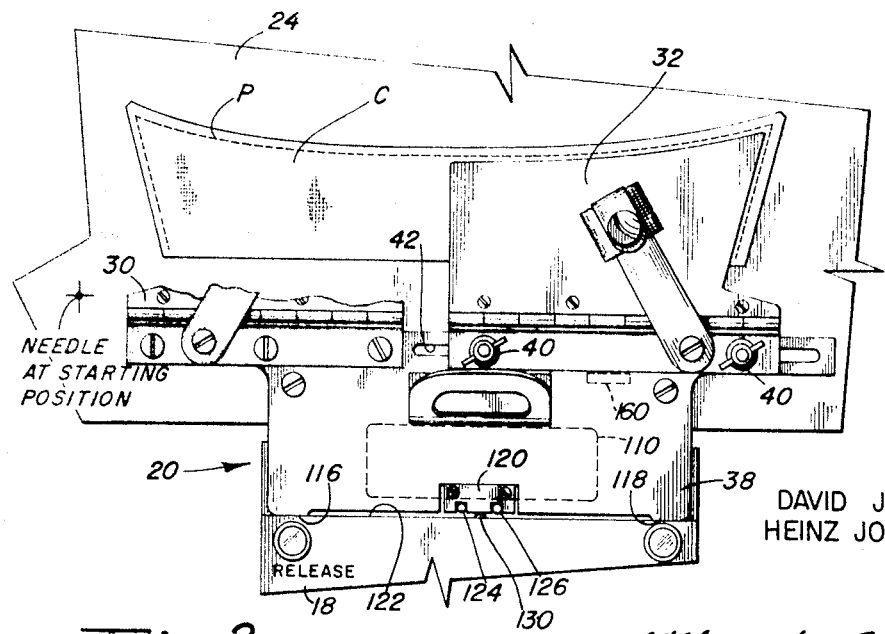
FIG. 2 is a top view of the movable carriage and the carriage-supported part holder of FIG. 1 partially broken away to show a layup of material sewn by the numerically controlled sewing apparatus of FIG. 1.

FIG. 2 shows the part holder 20 in greater detail and the portion of the Y carriage 18 on which the part holder is releasably mounted. The holder 20 is specially shaped for a shirt collar C, one of which is clearly visible in the portion of the holder which has been broken away. The collar C is formed of a layup of several materials which are to be sewn together along a stitch part P extending along three of its sides. The part holder 20 includes two material clamping portions 30 and 32 which together hold the layup in a spread condition so that three sides of the collar and the stitch path are exposed at the peripheral regions of the clamping portions. A sewing needle 34 (FIG. 1) and a presser foot 35 are driven in a reciprocating manner by the sewing machine 14 and the needle is supplied with thread from a spool 36. The part holder 20 is translated relative to the sewing machine 14 by the carriages 16 and 18, under the control of computer 12, in such a manner that the reciprocating sewing needle 34 is caused to move along the stitch path P and form a plurality of stitches in a conventional manner in cooperation with the associated looping mechanism (not shown) of the sewing machine 14.

Although the clamping portions 30 and 32 have peripheral contours conforming to the stitch path P, it will be understood that articles having shapes and stitch paths quite different from the collar C could also be sewn by the illustrated apparatus by providing the clamping portions with appropriate contours and programming the computer 12 for the particular path or pattern under consideration. In this respect, it wil be noted that the clamping portion 30 is fixedly secured to a base plate 38 of the part holder 20 and the clamping portion 32 can be adjusted on the base plate relative to the portion 30 by means of a pair of mounting bolts 40, 40 which can be loosened and slid in an elongated mounting slot 42 at one edge of the plate 38. This adjustability of the clamping porton 32 allows shirt collars for different neck sizes to be sewn with the same holder 20 since the contours of the collar tips are usually the same or approximately the same for several different neck sizes.

FIGS. 1, 3, 4, 5 and 6 show the details of the mechanism which moves the X carriage 16 and the Y carriage 18 back and forth on the support table 24. Such mechanism includes the components which guide the carriages 16 and 18 in the X and Y directions, respectively, and the drive motors which are controlled by the computer 12 to precisely position the carriages during the sewing operation.

The X carriage 16 moves relative to the sewing machine 14 on guide rails 50 and 52 and is driven by means of the X drive motor 54. The drive train between the motor 54 and carriage 16 is composed of a gear reduction unit, indicated generally by the numeral 58, a drive shaft 60 which extends parallel to the carraige 16 and is mounted with the table 24, an idler shaft 62 mounted within the table 24 and extending parallel to the drive shaft 60, a pair of toothed belt pulleys 664, 64 mounted at adajcent ends of the drive shaft 60 and the idler shaft 62, another pair of toothed belt pulleys 66 (one not shown) mounted at the opposite adjacent ends of the shafts 60 and 62, and two timing belts 68 and 70 which are threaded over the respective pairs of belt pulleys and are connected to the X carriage 16 by the fastenings 69 (one not shown). The rotational output of the drive motor 54 causes the carriage 16 to move back and forth on the guide rails 50 and 52 and is accurately controlled by the computer 12 for precise positioning of the carriage 16 with respect to the support table 24 and sewing machine 14. A pair of bumper pads 72 and 74 are positioned at the ends of the guide rails 50 and 52 and serve as emergency stops for the X carriage 16. A pair of limit switches (not shown) are located adjacent the extreme travel limits of the X carriage to electrically deactivate the drive motor 54 just before the bumper pads 72 and 74 are contacted.

The Y carriage 18 is mounted on the X carriage 16 for movement with the carriage 16 in the X direction and additionally translates relative to the X carriage 16 in the Y direction on a pair of guide rails 80 and 82. Since the part holder 20 is mounted from the Y carriage 18 in a cantilever fashion, guide rail 80 is engaged at both its upper and lower surfaces by means of a pair of rollers 84,84 mounted to the carriage 18 at the side of the carriage opposite the connection of part holder 20.

The drive mechanism for the Y carriage 18 is mounted to the X carriage 16 and includes drive motor 88, gear reduction unit 90, four toothed belt pulleys 92 positioned respectively adjacent the four corners of X carriage 16 and a timing belt 94 which is threaded over the belt pulleys 92 and connects to the Y carriage 18. The rotational output of the drive motor 88 translates carriage 18 back and forth on the X carriage in the Y direction and is controlled by computer 12 to accurately position the carriage 18 relative to the sewing machine 14 in the Y direction. Limit switches 96 and 98 are mounted on the carriage 18 and are actuated by blocks 100 and 102, respectively, mounted on the X carriage to electrically deactivate the drive motor 88 in an emergency. Two bumper pads (not shown) similar to the pads 72 and 74 are mounted at the respective ends of the guide rail 82 to physically limit the translation of the Y carriage 18.

As seen most clearly in FIGS. 2, 4, and 6, the base plate 38 of the part holder 20 is mounted in cantilever fashion from the side of the carraige 18 which is closest to the sewing machine 14. A magnetically permeable doubler 110 is connected to the portion of the plate 38 which overlies the carriage 18 and an electromagnetic chuck 112 mounted to the carriage 18 seizes the doubler 110 to secure the part holder 20 to the carriage 18 for movement therewith in the X and Y directions. The edge of the plate 38 opposite the sewing machine 14 bears two alignment surfaces 116 and 118 and a cutout in which an alignment bushing 120 is secured. The carriage 18 has an alignment surface 122 which mates with surfaces 116 and 118 to orient the part holder 20 and position the part holder properly on the carriages 16 and 18 with respect to the X direction. A pair of alignment pins 124 and 126 on the carriage 18 engage the corresponding cutouts in the alignment bushing 120 so that the holder 20 is positioned at the correct location on the carriage 18 with respect to the Y direction. A microswitch 128 mounted to the carriage 18 has an armature 130 which is engaged and actuated by the bushing 120 when the alignment surfaces 116 and 118 contact 122 and the cutouts of bushing 120 engage the alignment pins 124 and 126. The microswitch 128, when actuated, energizes the magnetic chuck 112 and the microswitch cannot be actuated unless the part holder 20 is properly positioned on the carriage 18. Therefore, the signal from the microswitch 128 also indicates that the holder is correctly positioned. Since the positioning of the carriages 16 and 18 and, consequently, the positioning of the part holder 20 relative to the sewing machine 14 are directly related to the stitch path to be followed, the alignment of the holder 20 on the carriage 18 is important and faulty alignment will mislocate the stitch path and possibly result in damage to the needle 34 of the sewing machine 14.

SEWING ROUTINE

An exemplary sewing routine performed by the numerically controlled sewing system starts with the X and Y carriages positioned substantially as shown in FIG. 1 adjacent one end of the support table 24. With system power turned on, the part holder 20 in which a collar C has already been clamped is loaded onto the Y carriage 18 by the machine operator to assume the position relative to the sewing needle indicated by the reference point "needle at starting position" of FIG. 2. If the part holder 20 is placed in its proper position on the alignment pins 124 and 126, the microswitch 128 is actuated, the magnetic chuck is energized, and an interlock signal arms the computer 12 for subsequent operations. When desired, the energization of the electromagnetic chuck 112 can be temporarily shut off by the clamp release switch 125 on the carriage 18 seen in FIG. 6. After the part holder has been properly positioned, the machine operator presses the start switch 127 to being the sewing operation. The computer commands the sewing machine and the carriages 16 and 18 to being a sewing routine. The motions of the carriages 16 and 18 are controlled so that the three sides of the collar C extending from the peripheral regions of the clamping portions 30 and 32 are caused to pass over a boss 132 on the support table 24 while the sewing machine 14 forms stitches in the collar on the stitch path P.

The sewing machine 14 is a conventional, quick-stop sewing machine which operates at slow speed or fast speed and includes the reciprocating needle 34, the reciprocating presser foot 35, a thread looping mechanism (not shown) which cooperates with the needle to form the stitches, and an automatic thread cutter 134 shown schematically. The stitching operaton is a cyclic operation and during each cycle, the needle 34 and the presser foot 35 reciprocate up and down to form a sewing stitch in conjunction with the looping mechanism. Th presser foot 35 precedes the needle 34 in the downward strokes of the reciprocating motions so that the collar material is pressed against the boss 132 before the needle 34 penetrates the material. Movement of the carriages 16 and 18 relative to the sewing machine while the needle is engaged with the material may be either continuous or interrupted depending on the adjustment of the control computer 12. As the needle 34 is withdrawn from the material, a loop is formed below the boss 132 and adjacent loops are interlaced by the looping mechanism to form the stitching. As the needle is withdrawn from the collar material, the presser foot 35 follows the needle is the upward stroke and releases the material from the boss 132. The material is then moved a distance equal to one stitch by the carriages 16 and 18 and the cyclic stitching operation of the sewing machine is repeated. This cyclic operation continues with the motions of the collar and carriages 16 and 18 being controlled by the computer 12 to cause the sewing needle 34 to transverse the entire stitch path P. At the end of the sewing operation, the thread is severed by the automatic thread cutter 134 on command from the computer.

The sewing machine 14 is provided with several needle position sensors for stopping the needle in both the "down" and "up" positions during various machine operations. FIG. 7 shows these sensors which are located at the end of the sewing machine body opposite the end from which the sewing needle 34 is suspended. A drive shaft 136 which reciprocates the needle 34 projects from the machine body and is driven through a pulley 138 by a belt and an associated motor (not shown). A plurality of needle position commutator rings, 140, 142, 144, and 146 are connected to the shaft and mate respectively with position pickups 148,150,152, and 154. Three of the position pickups 148, 150 and 152 are employed by the illustrated machine for operating it through its stitching, slow speed and thread cutting operations. These operations and associated mechanism are conventional in commercial type, quick-stop sewing machines and, therefore, are described below only to the extent necessary to understand the present invention. The fourth position pickup 154 and the mating ring 146 are not conventional parts of the sewing machine and are utilized as a timing signal generator for triggering the movements of the carriages 16 and 18 as described in greater detail below.

When the stitching along the stitch path P is completed, the automatic thread cutter severs the thread from the collar C, and the needle 34 and presser foot 35 stop in the "up" position. The computer 12 then commands the carriages 16 and 18 to move the part holder 20 with the collar C to one end of the support table 24 adjacent the computer 12 to engage the part holder 20 in a latching mechanism shown in FIG. 8. As the part holder 20 moves to the left in FIG. 8, toward the latching position, a tang 160 projecting downwardly from the base plate 38 moves over a latch 162 which is pivotally mounted on a pin 164 projecting horizontally from the support table 24 in the vicinity of the guide rail 50 (FIG. 3). A stop pin 166 is mounted in the table 24 and extends parallel to the mounting pin 164. The latch 162 is biased against the stop pin 166 by means of a latch spring 168 connected between the latch 162 and a lug 170 on the support table 24. The latch 162 has a bifuracated, projecting end formed by a slot 172 which is slightly wider than the tang 160. As the part holder 20 is translated over the latch 162 by the carriages 16 and 18, the latch 162 is first depressed slightly by the tang 160, as indicated in phantom in FIG. 8, and subsequently springs back to its original position in abutment with the pin 166 and with the tang 160 captured in the slot 172 at the projecting end of the latch. The magnetic chuck 112 is de-energized by a command from the computer to release the part holder 20 and the carriages 16 and 18 then translate away from the released part holder at a slight angle to the tang 160 and slot 172, which extend generally in the X direction, to insure disengagement of the part holder 20 and the chuck 112. The carriages 16 and 18 then return to the starting position shown in FIGS. 1 and 2 at the opposite end of table 24 where another part holder 20 and collar C are loaded onto the carriage 18 for a subsequent sewing oeration.

CONTROL COMPUTER

After the operator presses the start button 127, the enitre work routine required to complete the sewing of the material held by the work holder is controlled automatically by the control computer 12. The computer 12 contains a memory tape which is pre-programmed with information defining the machine functions, such as sewing machine start commands, thread cutting commands and magnetic chuck unclamping commands, as well as information which controls the movements of the X carriage 16 and Y carriage 18. In addition to the memory tape, the computer 12 also receives input information through the sensor signal cable 23 from various external controls associated with the sewing machine 14 and carriages 16 and 18. From the information received from the various sources, the computer generates and transmits command signals to the controlled components of the system through the command signal cable 22 at the appropriate times during the sewing operation.

Figure 9:
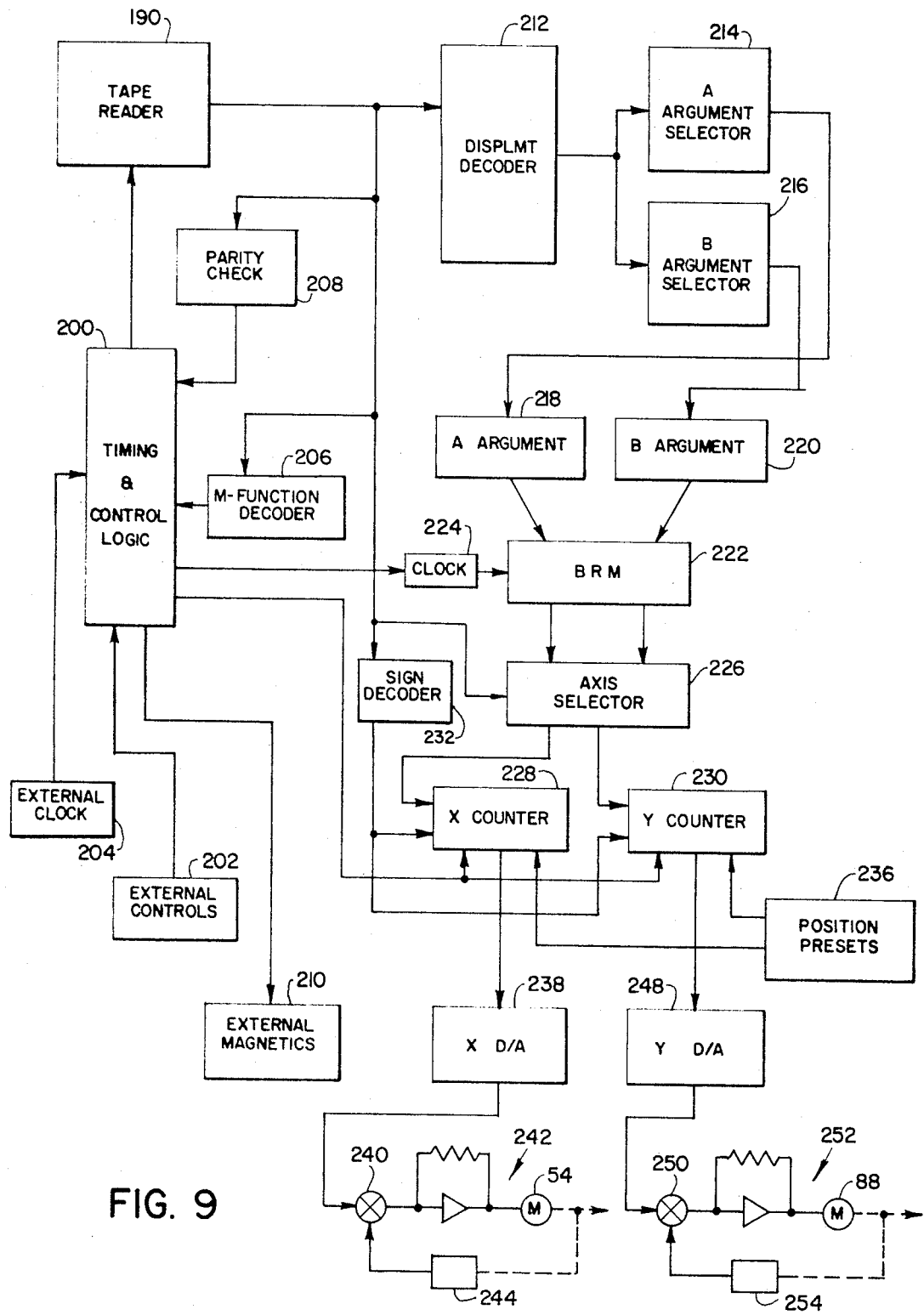
FIG. 9 is a block diagram of the control computer and associated components of the sewing apparatus of FIG. 1.

FIG. 9 is a block diagram showing the various components of the computer 12 and the associated apparatus controlled by the computer. FIG. 9 provides only a general understanding of the computer construction and operation. The computer components are described in greater detail in conjunction with more detailed figures at subsequent portions of the specification. The timing and control logic circuitry 200 of the computer receives input signals from the external controls 202, such as the start switch 127, the positioning microswitch 128 and the external clock 204, formed by pickup 154 and the mating ring 146 (FIG. 7) on the sewing machine 14, which generates timing pulses in synchronism with the reciprocating motion of sewing needle 34. Within the computer itself, the logic circuitry 200 received signals from an M-function decoder 206 and a parity check circuit 208. The circuitry 200 is connected to the tape reader 190 to transmit to it timing pulses which advance the memory tape frame-by-frame. The tape reader 190 reads coded information on the memory tape and supplies the information to various components of the computer including the M-function decoder 206. The M-function decoder 206 processes certain coded command signals relating to machine functions, such as fast sew commands, unclamping commands and others, and relays the information in an intelligible form to the logic circuitry 200. Utilizing the M-function commands, the circuitry 200 actuates the elements of the computer and the external magnetics 210 which include the motor control relays of the sewing machine 14, the magnetic chuck 112 and the automatic thread cutter 134. The parity check circuit 208 monitors the information provided by the tape reader 190 and inhibits the logic circuitry 200 from initiating a subsequent work routine in the event that a parity error is detected.

Vector information defining the movements of the sewing needle and collar C relative to one another for each stitch on the stitch path P is also contained in the memory tape in coded form and is processed by the digital motor control circuits of the computer 12 shown generally at the right-hand side of FIG. 9. The displacement decoder 212 receives a portion of the coded information from the reader 190 and reduces the information to signals which are utilized by the motor control circuitry for the X carriage 16 and the Y carriage 18. The information from decoder 212 is transmitted to an A argument selector 214 and a B argument selector 216. The argument selectors produce signals which are related to the respective magnitudes of the X and Y components of the movements of the sewing needle and collar C relative to one another. The A argument information is transferred from the selector 214 to an A argument register 218 and the B argument information is transferred from selector 216 to B argument register 220. The argument registers 218 and 220 are connected respectively in parallel channels through a binary rate multiplier 222 having a cycle clock 224, controlled by the logic circuitry 200, and an axis selector circuit 226 which also received coded information from the tape reader 190. The axis selector circuit 226 has two outputs which respectively transmit X motor pulses to an absolute X motor pulse counter 228 and Y motor pulses to an absolute Y motor pulse counter 230. The counters 228 and 230 are both up/down pulse counters controlled by a sign decoder 232 which also receives coded information from the tape reader 190. The counters 228 and 230 are also connected directly to the logic circuit 200 which acts to clear them after each sewing operation. A position preset circuit 236 has outputs connected respectively to the counters 228 and 230 for establishing an initial setting in the counters at the beginning of each work routine. The output of the X counter 228 is connected to an X digital-to-analog converter 238 which converts the digital count to an analog signal that is utilized by an analog servo-control circuit for the drive motor 54 connected to the X carriage 16. The analog control circuit receives the analog signal at a summing junction 240 which feeds a servo-amplifier 242 for the drive motor 54. A position feedback potentiometer 244 measure the output rotation of motor 54 and supplies a position feedback signal to the summing junction 240. In a similar fashion, the output of Y counter 230 is connected to a digital-to-analog converter 248 which drives an analog servo-control circuit for the drive motor 88 which translates the Y carriage 18. Again, the analog signal is applied to a summing junction 250 which feeds a servo-amplifier 252. A position feedback potentiometer 254 measure the output of drive motor 88 and supplies a position feedback signal to the summing junction 250.

Figures 10, 15:
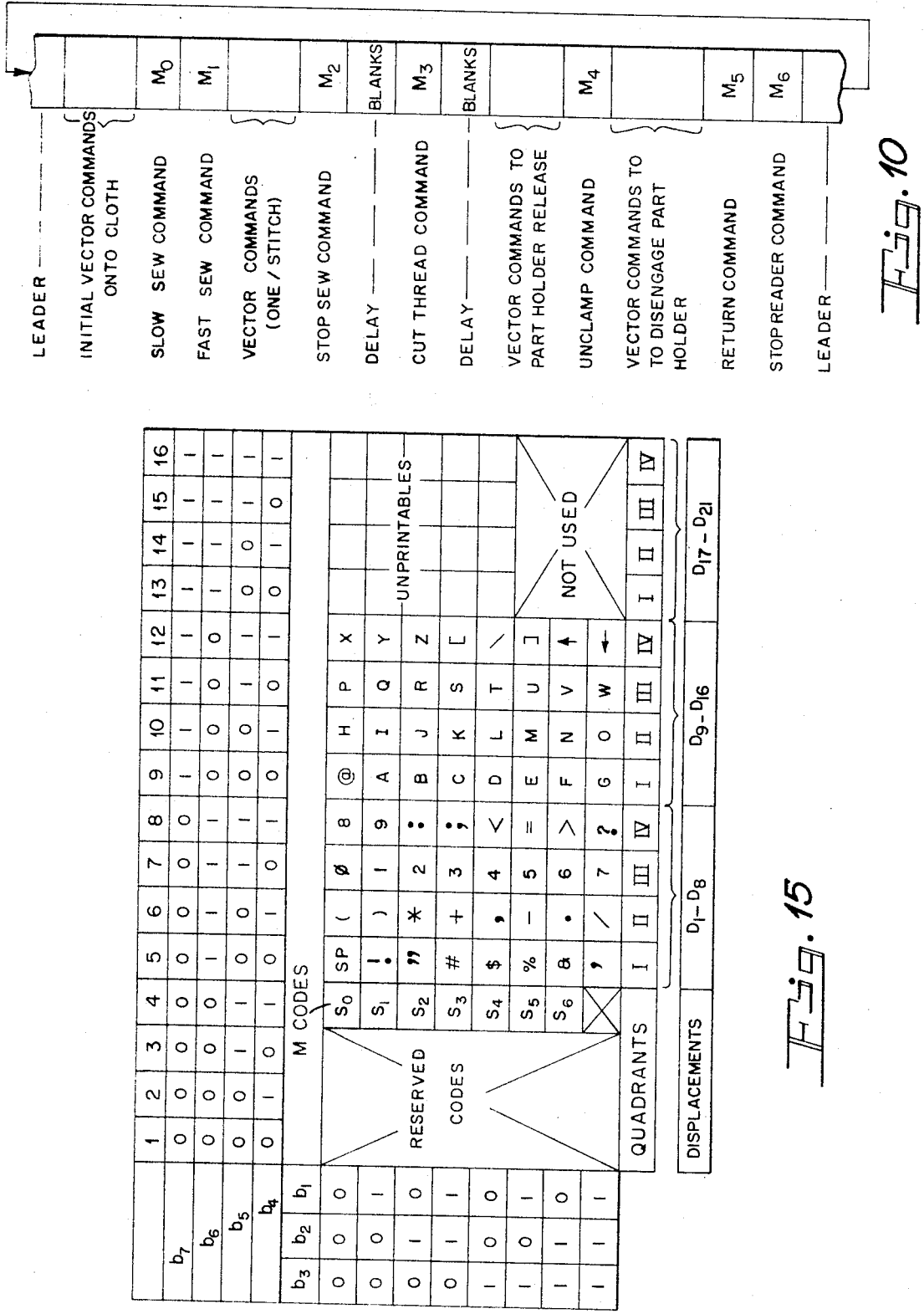
FIG. 10 is a segment of memory tape used with the apparatus of FIG. 1 and showing a sequence of steps in an exemplary sewing operation.
FIG. 15 is a table showing the digital coding utilized to program the memory tape in the apparatus of FIG. 1.

FIG. 10 shows a segment of a memory tape which is programmed as indicated with information defining an exemplary sewing routine described briefly above. The memory tape utilized by the numerical control system is preferably a multi-track tape formed in a loop to be read and re-read as often as the sewing routine is to be repeated. Tapes of this type may be either multi-track, magnetic memory tapes or multi-track, punched tapes in which information defining the machine operations is imposed on the tape in a digital form. the tape reader 190 (FIGS. 1 and 9) is a multi-track reader having a number of channels, for example, eight, corresponding to the number of tracks on the tape in which digital information is stored. The tape reader advances the tape frame-by-frame on command and reads the digital information which is then transferred to the various elements of the computer.

Considering further the work routine commanded by the illustrated tape of FIG. 10, the routine begins with the initial vector commands which move the carriages 16 and 18 so that the part holder 20 goes from the starting position shown in FIG. 2 at which the needle is off the cloth, to a position at which the needle is located over the cloth at one end of the stitch path P. The needle off the cloth starting position is established by the position preset circuit 236 of FIG. 9. Following the initial vector commands, which bring the needle to the start of the stitch path, the memory tape in the illustrated case provides two machine function (M-function) commands $M_0$ and $M_1$. The $M_0$ command is a "slow sew" command and the $M_1$ command is a "fast sew" command. To obtain operation of the sewing machine at its fast speed, the $M_1$ command will be proceeded by the $M_0$ command, and therefore in the present instance the appearance of the $M_0$ and $M_1$ commands cause the sewing machine to immediately begin its stitching operation at the fast speed. It will of course be understood that this need not always be the case. In some cases the sewing machine may be started and operated throughout the entire sewing routine at its slow speed, this requiring the appearance of only the $M_0$ command at the start of such operation. Or, the machine may be started at its slow speed and operated for a few stitches at such speed and then shifted to its fast speed, this requiring the appearance of the $M_0$ command followed by a few vector commands and then the appearance of the $M_1$ command followed by more vector commands.

Following the "sew" commands, the $M_0$ and $M_1$ commands, a series of vector commands, one command for each stitch along the stitch path P, appear on the tape of FIG. 10. These vector commands define the motions of the carriages 16 and 18 which cause the sewing needle 34 to follow the stitch path P at the periphery of the collar C (FIG. 2). Following the last vector command corresponding to the last stitch at the end of the stitch path P, the memory tape provides a "stop sew" command $M_2$ which stops the stitching operation of the sewing machine with the reciprocating sewing needle 34 in its "down" position. A delay of approximately one-half second is generated by several blank spaced on the memory tape which provide the time needed for the sewing machine operating at high speed to come to a complete stop with the reciprocating needle in its "down" position. The thread cutting command $M_3$ follows the delay and is in turn followed by another delay generated by several blank spaces on the tape so that the sewing machine can complete the thread cutting operation and position the reciprocating needle in its "up" position disengaged from the collar C. The tape then provides another series of vector commands which move the carriages 16 and 18 so that the part holder 20 is moved into the release mechanism, shown in FIG. 8, with the tang 160 being moved over the spring biased latch 162. An "unclamp" command $M_4$ is then supplied by the tape. The "unclamp" command de-energizes the magnetic chuck 112 and subsequent vector commands cause the carriages 16 and 18 to pull away from the part holder at a slight angle to the Y direction to cause the part holder to remain engaged in the latch 162 while the dbouler 110 and the magnetic chuck 112 separate. A "return" command $M_5$ causes the carriages 16 and 18 to return to the start position shown in FIG. 2 relative to the sewing needle. The last command $M_6$ causes the tape reader to stop and thus completes the work routine. Where the tap is formed in a loop for repeating the routine a number of times, the leader following the command $M_6$ is continuous with the leader at the beginning of the tape as indicated by the arrow. The next routine is initiated by pressing its start button 127 which again starts the tape reader in operation.

One embodiment of the timing and logic control circuitry 200 specifically adapted to operate in response to the sewing routine programmed on the memory tape in FIG. 10 is shown in detail in FIG. 11. The M-function commands from the memory tape are supplied from the tape reader through the M-function decoder 206, to the inputs of a number of flip-flops which control various machine functions during the sewing routine.

When power is first applied to the computer 12 at the start of a work period, the reset circuitry 300 transmits a pulse to the $\bar{Q}$ stage of each of the flip-flops 302, 304, 306, 308, 310, and 312 to set the outputs of the $\bar{Q}$ stages in the high level or binary 1 state while the outputs of the Q stages assume the low level or the binary O state. The reset circuitry 300 is also responsive to a clear switch 314 which can be actuated by the machine operator at any time during the sewing routine to reset the flip-flops to the starting condition.

With the flip-flops set in this starting condition the machine operator presses the "start-sew" switch 127. The circuit for this switch passes through interlock switches 315 including the microswitch 128 (FIG. 6), to assure that the part holder 20 is correctly positioned on the Y carriage 18 before the stitching begins. Grounding the tied inputs of the NAND gate 316 by the closing of the switch 127 changes the output of the gate and in turn causes the output of the AND gate 318 to change assuming that an enabling signal is applied to the gate 318 by the flip-flop 302. The Q stage of flip-flop 302 is connected to the parity check circuit 208 which monitors each channel of the tape reader 190 as indicated by the eight word bit inputs to the circuit. The circuit 208 is a conventional parity check circuit and changes the state of flip-flop 302 from that originally established by the reset circuit 300 in the event that a non-parity reading is made by the tape reader. Very briefly, the parity check circuit detects the number of pulses or holes read in the individual tape frames, and if an odd number of pulses or holes is detected rather than an even number, one of the tape tracks being reserved to round out the number for parity checking purposes, the circuit produces a signal which changes the state of flip-flop 302 and turns on the parity error light 320. At the same time, flip-flop 302 disables gate 318 and prevents a subsequent work routine from being started. The parity error condition can be overridden by the operator by resetting flip-flop 302 through the clear switch 314 and the reset circuit 300.

With AND gate 318 enabled, the start sew signal from switch 127 is transmitted to the Q stage of flip-flop 304 which sets the output of the Q stage to its 1 state and enables AND gate 322. With the $\bar{Q}$ stage of flip-flop 306 already in the 1 state, the enabling signal of flip-flop 304 starts a master timing clock 324 within the timing and logic control circuitry 200 which clock sends clock pulses through the OR gate 326. Each clock pulse transmitted by the gage 326 forms a timing pulse $T_1$ which causes information from one frame of the multi-track memory tape to be read into the computer 12 and also actuates the tape reader 190 to advance the tape to the next frame. It will be seen from the exemplary memory tape shown in FIG. 10 that the first set of comands received by the computer 12 are the vector commands which move the carriages 16 and 18 to place the one end of the stitch path P under the sewing needle 34. The rate at which the vector commands are read is controlled by the master clock 324 until the $M_0$ command is read and applied to flip-flops 306, 308 and 312. The change in the output of the Q stage of flip-flop 306 enables AND gate 330 which in turn energizes a slow-sew relay 332 in the motor control circuitry of the quick-stop sewing machine 14 and starts the reciprocation of the needle 34 at slow speed. The change in state of flip-flop 306 also disables gate 322 and shuts off the master clock 324. The output of gate 330 enables AND gate 336. The previously described pulse generator or external clock 204 associated with the sewing machine 14 transmits a clock pulse through gate 336 to gate 326 and the tape reader 190 with each cycle of the reciprocating sewing needle 34.

The tape reader 190 is therefore synchronized with the sewing machine stitching operations and advances the multi-track memory tape by one tape frame for each stitch formed. The tape is programmed so that information defining the relative movements of the needle 34 and the collar C for a single stitch is contained within a single tape frame as described in greater detail below. If the sewing machine slows down under load due to the weight or thickness of the collar material being sewn, the tape reader slows down correspondingly. Conversely, if the sewing machine speed increases, the tape reader speed also increases. With the $M_0$ command applied to flip-flop 312, a fast-sew relay 334 in the motor control circuitry of the sewing machine 14 is de-energized to prevent the sewing machine from operating at high speed. However, as seen in FIG. 10, in the illustrated case, the $M_0$ command is immediately followed by the $M_1$ command which resets flip-flop 312 and the sewing machine shifts to high speed operation. It may be desirable to interpose several vector commands between the $M_0$ and $M_1$ commands to that the initial stitching operation, during which the thread becomes anchored in the cloth, occurs at slow speed. The $M_0$ command is also applied to the Q stage of the flip-flop 308 and disables AND gate 342 to de-energize the thread cutter relay 340 and prevent actuation of the automatic thread cutter 134.

With the sewing machine 14 operating in its fast-speed mode, the multi-track tape provies a series of vector commands, one command being provided for each synchronizing pulse or cyclic operation of the reciprocating sewing eedle 34. The commands are acted upon by the computer 12 and cause the carriages 16 and 18 to move the reciprocating needle and collar C relative to one another in a series of vector displacements, each executed by a respective one of the vector commands, so that a series of stitches are formed along the stitch path P. After the last vector command has been given and responded to and the sewing machine has formed the last stitch at the end of the stitch path P, the "stop sew" command $M_2$ resets flip-flop 306 to disable AND gates 330 and 336 and prevent further synchronizing pulses form the external clock 204 from reaching the tape reader 190. The resetting of gage 330 deactivates the slow-sew relay 332 which also disables the fast-sew relay 334 in the sewing machine motor controls. The motor controls, aided by the position pickup mechanism shown in FIG. 7, brake the sewing machine from high speed to slow speed and continue to run the sewing machine at slow speed until the reciprocating needle 34 is in the "down" position at which point the reciprocating needle stops. The $M_2$ command also enables gate 322 and starts the master clock 324. While the sewing machine is slowing down and positioning the needle in its "down" position, the master clock 324 advances the memory tape through a series of blank spaces which provide the necessary time delay, approximately one-half second, for these operations to be accomplished. Following the time delay, a "cut-thread" command $M_3$ is transmitted from the tape to the flip-flop 308 which pulls the thread cutter relay 340 through the AND gate 342 and begins the conventional thread cutting operation. During the cutting operation, the automatic thread cutter 134 is actuated and the sewing needle 34 is moved from the "down" position engaged with the collar material to the "up" position by the sewing machine motor controls and the position pickup mechanism in FIG. 7. While the thread is being cut, the master clock 324 continues to advance the memory tape through another series of blank spaces which provide the necessary time delay for the thread-cutting operation to be accomplished.

Following the thread-cutting operation, the memory tape provides a series of vector commands which shift the carriages 16 and 18 toward a position in which the part holder 20 is engaged by the latching mechanism shown in FIG. 8. When the tang 160 has moved into the position in which it is engaged by latch 162, the memory tape provides the "unclamp" command $M_4$ to the Q stage of the flip-flop 310 and the unclamping relay 344 is energized. The relay 344, in turn, de-energizes the magnetic chuck 112 which holds the part holder 20 to the carriage 18. The memory tape then supplies a series of vector commands which move the carriages 16 and 18 in a direction which is at a slight angle to the Y axis of the sewing machine to insure disengagement of the part holder 20 from the chuck 112.

The next command $M_5$ pulses OR gate 346 and produces a clear signal CLR. The clear signal resets the X counter 228 (FIG. 9) and the Y counter 230 to a count established by the position preset circuitry 236. With the resetting of counters 228 and 230, the analog outputs of converters 228 and 248 are also reset and the carriages 16 and 18 return rapidly to the initial positions occupied by the carriages at the beginning of the sewing routine. It should also be noted that OR gate 346 has another input from reset citcuit 300 so that the counters 228 and 230 are set to the preset value and the carriages move to the starting position during power up operations or whenever the clear switch 314 is actuated by the machine operator during the sewing routine.

The subsequent and last command derived from the memory tape is the "stop reader" command $M_6$ which is applied to flip-flops 304 and 310. The resetting of flip-flop 304 disables AND gates 322, 330, and 342. Disabling gate 322 stops the master clock 324 and the tape reader 190 and terminates one sewing routine. The resetting of flip-flop 310 disenages the unclamp relay 344 and re-enables the magnetic chuck 112 for the next sewing routine.

COMMAND CODING

It will be appreciated that the cyclic operation of a machine, such as the stitching operation of the sewing machine 14, imposes limitations on the numerical control system which provides the relative movment between the cyclically operated tool and the work piece being operated upon. First of all, the relative speed between the tool and work piece is governed by the cyclic rate of the machine operation. In the present numerical control system, synchronization of the stitching operation and the movements of the carriages 16 and 18 is maintained by slaving the tape reader 190 and the rest of the timing and control logic circuitry 200 to the sewing machine by means of the external clcok 204. Secondly, in addition to the speed synchronization, the relative movements between the collar C and the reciprocating needle 34, should preferably be phased with the cyclic operation of the needle so that the collar is translated while the needle is disengaged from the material being sewn. A special form of command coding is utilized to meet both of the above requirements.

With the sewing machine 14 providing a single synchronizing pulse which advances the tape by one frame during each stitching cycle, it is necessary that the movements of the carriages 16 and 18 for any given stitch be completely defined in a single tape frame. To allow this to be done with a memory tape having a limited number of tracks, such as conventional eight track punched paper tape wherein each transverse row of hole locations constitute one frame, a program is employed wherein the movement of the needle along the stitch path is defined through the use of a limited set of possible vector commands and corresponding movements. That is, when the needle is at any given point relative to the material being sewn, it may be moved to the next new point only by moving it along one vector displacement chosen from a limited set of possible vector displacements. In the illustrated case, as hereinafter described, the needle after it has arrived at one point on the material may be moved from such point along any one of 84 possible vector displacements having approximately equal lengths but discretely different angular coordinates distributed around the origin. Each of these possible vector displacements is uniquely identified by a particular vector command in accordance with the coding scheme described below.

The coding scheme employed for coding both the M-function commands and the vector commands may be best understood by reference to FIGS. 12 and 15. Considering first the vector commands, FIG. 12 discloses 21 displacements $D_1$ to $D_{21}$, located in one quadrant which have approximately the same magnitudes and which are angularly separated from one another by substantially equal angles. The magnitudes of these displacements are chosen to be approximately equal so that the lengths of all the stitches made by the sewing machine will likewise be approximately equal to one another. The angular deviations between the several displacements are small enough to provide sufficient angular resolution for the stitches. The 21 displacements shown for the quadrant of FIG. 12 are repeated in the other three quadrants to produce a total ob 84 such displacements in all four quadrants.

Each of the 21 displacements of FIG. 12 is defined by a pair of arguments shown in the table of FIG. 13. These arguments are treated as components of the displacements without regard to the particular quadrant in which the displacement is utilized. When the displacement is identified with a quadrant, the arguments represent the number of unit displacements in each component along the coordinate axes, a unit displacement corresponding to the smallest non-zero component. For example, displacement $D_1$ is shown to have an A argument of 15 unit displacement and a B argument of zero unit displacements. These values correspond respectively to the magnitudes of the components of displacement $D_1$ in quadrant I along the X and Y axes. It will be noted, however, that in quadrant II the arguments and axes have a relationship which is the reciprocal of that in quadrant I. For the displacement $D_1$, the X component is zero and the Y component is 15 units. The same reciprocal correspondence is true of the other displacements. FIG. 14 shows the four different quadrants defined by the X and Y axes in a Cartesian coordinate system and the relationships between the arguments and the axes are indicated in each quadrant. The arguments and axes have one relationship in quadrants I and III and the reciprocal relationship in quadrants II and IV.

The table of FIG. 15 disclosed the actual digital coding scheme utilized for recording both the M-functions and the vector commands on a memory tape having at least seven information tracks and preferably eight tracks since an eighth track may be utilized in a parity check system such as disclosed above. The table discloses the bit information in each track as a 1 or a 0 corresponding to the presence or absence of a hole in a punched tape or the direction of the magnetic polariztion in a magnetic tape. The word bits which appear in tracks 4,5,6 and 7 are shown as permutations at the top of the table, the coding of the bits which appear in track 7 being identified for example by the horizontal row of the table designated $b_7$. The word bits which appear in tracks 1, 2, and 3 are shown as permutations at the left-hand side of the lower portion of the table, the coding of the bits which appear in track 1 being identified for example in the vetical column designated $b_1$. The combinations of the permutations make available 128 different codes. Of these codes, 24 are reserved, as indicated in columns 1–3 of the table, and the remainder are available for commands. The seven M-function codes are associated with column 4 of the table, each M-function being uniquely associated with one set of word bits. As an example, the M-function command $M_6$ would be represented in a tape frame having the binary coding 0011110 when the tracks are read from track 7 to track 1.

In a similar respect, each of the 84 vectors individually defined by one of the 21 vectorial displacements $D_n$ and one of the four quadrants formed by the X and Y axes, is uniquely associated with one of the codes defined in columns 5–16 of the table. In particular, displacement $D_1$ in quadrant I is identified by the coding associated with the block of the table containing the symbol SP. In other words, the tape frame having the binary code 0100000 as read from track 7 to track 1 is a command to the computer directing that the X and Y carriages produce a movement defined by the displacement $D_1$ in the first quadrant. Each of the remaining codes in column 5 is uniquely associated with one of the first eight displacements $D_1$–$D_8$ in the first quadrant, the order of the codes down the column following the numbering of the displacements. The quadrant and displacement $D_n$ with which the blocks of the table are associated are indicated at the lower portion of the table. Additionally, it will be noted that the displacements in any one column fall in one of the quadrants and the displacements $D_1$–$D_8$ in all four quadrants are identified by the codes in the table columns 5, 6, 7 and 8. The codes identifying the displacements $D_9$–$D_{16}$ appear in columns 9, 10, 11 and 12 and the displacements $D_{17}$–$D_{21}$ are identified in columns 13, 14, 15 and 16. Since there are more than enough blocks for the 84 vectors and seven M-functions, not all of the possible codes are used.

It will be noted that each of the codes for the displacements in columns 5–12 is identifed by a unique printable character. These characters and the codes representing them are taken from the American Standard Code for Information Interchange (ASCII), and are presented in FIG. 15 only for the purpose of making evident that the coded commands used in the system of this invention may be readily transmitted by existing telegraphic equipment. This permits new tape programs to be transmitted telegraphically between a programming center where the programs are generated and a user having a telegraph terminal with a standard eight channel tape printer. Since there are 84 different vector commands and seven M-function commands, certain unprintables in the telegraphic system are utilized as indicated in the table columns 13–16. The codes associated with columns 1–3 are reserved for telegraphic ASR control functions.

From the table of FIG. 15, it is readily apparent that the digital information in one seven-track frame or the set of signals produced from the frame can completely define either an M-function or a particular vector describing a movment of the needle and collar relative to one another. By appropriate scaling of the vector command signals, the actual movement of the carriages can be made equivalent to the length of a single sewing stitch along the stitch path P. The computer 12 contains appropriate decoding networks which are capable of interpreting the binary information in a tape frame and generating a corresponding command for either the carriages or the external magnetic controls associated with the mechanical apparatus.

M FUNCTION COMMAND DECODING

FIG. 16 reveals in greater detail the M-function decoder 206 of FIG. 9 which receives sets of coded digital signals representing the M function commands from the tape reader 190 and applies the M function command signals in an intelligible form in the timing and control logic circuitry 200 shown in FIGS. 9 and 11. The decoder 206 is composed principally of an actual decoder 370 and an AND gate 372. The octal decoder 370 receives word bit information from tracks 1, 2 and 3 of the memory tape and is enabled by AND gate 372 to turn on one of the outputs uniquely associated with the bit information and one of the M functions. Since there are only seven M function commands, the eighth output of the decoder 370 is not used. The binary information from tracks 4, 5, 6 and 7 is used to enable the decoder 370 through the AND gate 372 in conjunction with the timing pulse $T_1$ generated by either the master clock 324 or the external sewing machine clock 204 both shown in FIG. 11. As indicated in column 4 of the table in FIG. 15, the digital information in tracks 4, 5, 6 and 7 written in Boolean terminology as $b_4 b_5 \bar{b}_6 \bar{b}_7$ identifies an M function command. When such information is present at the inputs to AND gate 372 with the timing pulse $T_1$, as shown in FIG. 16, the octal decoder 370 is enabled and the inputs from tracks 1, 2, and 3 are decoded into the appropriate M function command. The M function command is transmitted from the decoder 370 to the appropriate flip-flop shown in FIG. 11 and produces the corresponding machine operation as described above.

VECTOR COMMAND DECODING

The vector commands supplied by the tape reader 190 from the memory tape frames as sets of coded digital signals are decoded in part by the displacement decoder 212 shown in the digital motor controls in FIG. 9 and detailed in FIG. 17. The decoder 212 identifies the vector displacements without associating the displacements with the particular quadrants in which the relative movements are to take place.

The decoder 212 includes three octal decoders 380, 382 and 384 which have the same construction and mode of operation as the octal decoder 370 in FIG. 16. The inputs of the decoder 380 are associated with the tape tracks 1, 2, 3 and the output of the AND gate 386 which enables the decoder whenever the digital information in tracks 6 and 7 corresponds to the Boolean term $b_6 \bar{b}_7$. Reference to the table in FIG. 15 discloses that the eight displacements $D_1 - D_8$ are defined by the digital information in tape tracks 1, 2 and 3 and the information in tracks 6 and 7 represented by the Boolean term $b_6 \bar{b}_7$. Hence the outputs of the decoder 380 correspond to the first eight vector displacements which are utilized in each quadrant defined by the coordinate axes.

In a similar respect, the decoder 382 has inputs from tape tracks 1, 2, 3 and receives an enabling signal from AND gate 388. The gate 388 is turned on by the information in tracks 6 and 7 represented by the term $\bar{b}_2 b_7$. Reference to the table of FIG. 15 reveals that the term $\bar{b}_6 b_7$ is unique to the displacements $D_9 - D_{16}$ defined in columns 9–12 of the table and accordingly, the outputs of decoder 382 correspond to displacements $D_9 - D_{16}$. The remaining displacements $D_{17} - D_{21}$ are decoded by octal decoder 384 having inputs from the tape tracks 1, 2 and 3 with an enabling signal provided by AND gate 390. The AND gate is turned on by the presence of the digital signals represented by the term $b_6 b_7$ which is unique to displacements $D_{17} - D_{21}$ identified in columns 13–16 of the table. Three outputs of the octal decoder 390 are not used.

With the vector displacement identified by displacement signals from the decoder 212, the displacement signals are transmitted to both the A argument selector 214 (FIG. 9) and the B argument selector 216 which resolves the displacement signals into signals representing the magnitudes of the components of the vector displacements along the X and Y coordinates but without specific identity to one or the other of the coordinates.

Figure 18:
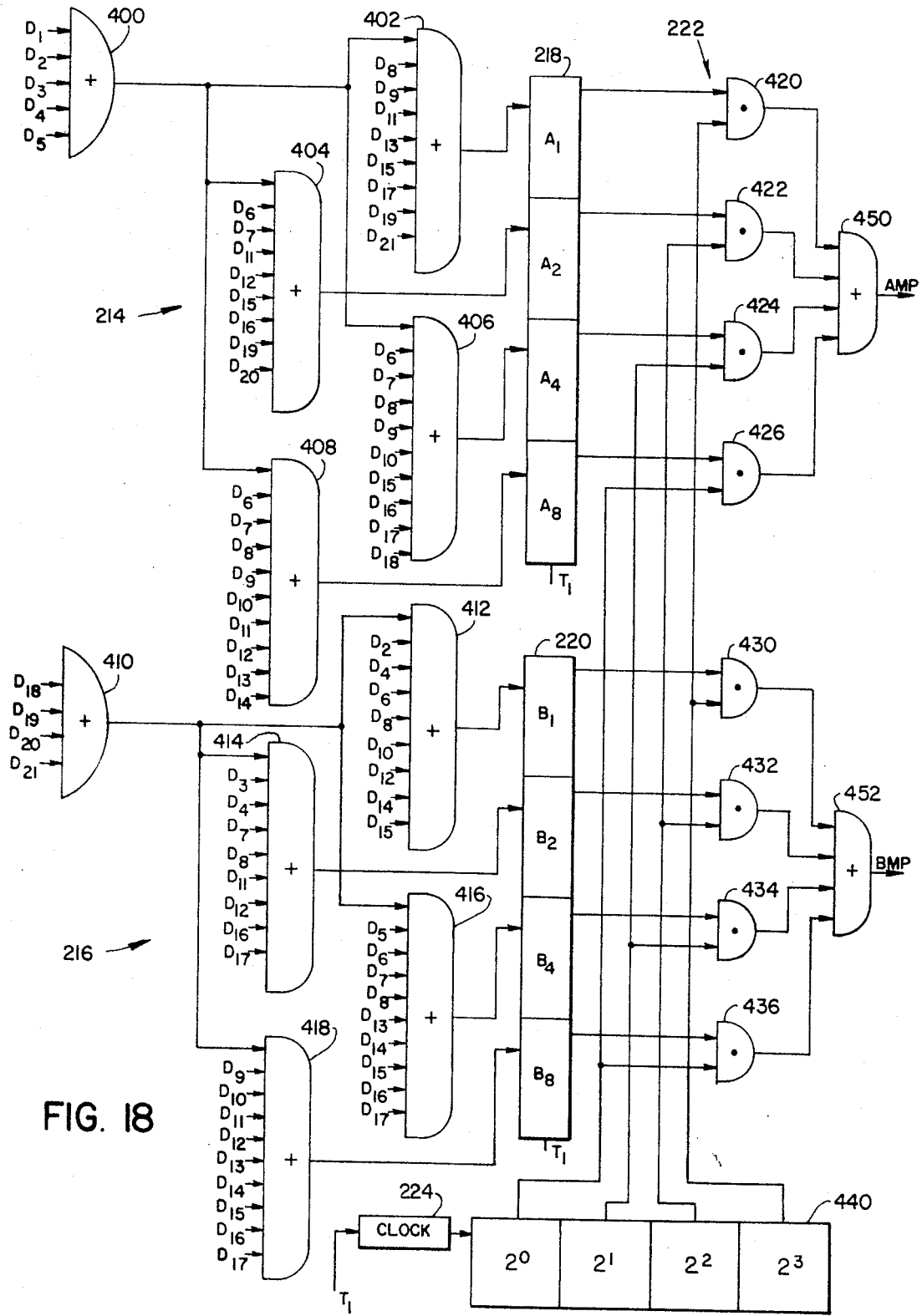
FIG. 18 is a diagram showing in detail a portion of the control computer of FIG. 9 which processes the vector displacement signals.

FIG. 18 shows the detailed constructions of the argument selectors 214 and 216 to be a plurality of interconnected OR gates. In particular, the A argument selector 214 is composed of OR gates 400, 402, 404, 406 and 408 and the B argument selector 216 is composed of OR gates 410, 412, 414, 416 and 418. Each of the OR gates has inputs from selected outputs of the octal decoders 380, 382 and 384 shown in FIG. 17. The logic of the interconnected OR gates is such that the outputs of the OR gates connected to the A argument register 218 set in the register 218 binary numbers corresponding to the respective magnitudes of the A arguments shown in the table of FIG. 13 and the outputs of the OR gates connected to the B argument register 220 set in the register 220 binary numbers corresponding to the respective magnitudes of the B arguments in FIG. 13. Each of the argument registers 218 and 220 is set with information taken from the memory tape and held in the OR gates when the timing pulse $T_1$ is transmitted to the registers from either the master clodk 324 (FIG. 11) or the external clock 204. The same timing pulse causes the tape reader to advance the memory tape to the next frame in preparation for the next vector command. Until a subsequent timing pulse is received, the argument registers retain the information transmitted to them from the OR gates on the previous pulse.

In the illustrated embodiment of the invention, the argument information is placed in a form that can be utilized by the carriage drive motors by means of the BRM 222 connected to the outputs of the registers 218 and 220. The operation of a BRM is already well known in the numerical control art and is utilized to produce trains of pulses from motion command registers, each train having a number of time-phased pulses corresponding to the count in each register and the pulses of each train being distributed approximately evenly over the cycle time of the BRM clock so that the speeds or rates of displacement of the workpiece and tool are proportional to the magnitudes of the components along the coordinate directions. The BRM 222 is shown schematically as including a first set of AND gates 420, 422, 424, and 426 connected to the outputs of the A argument register 218 and another set of AND gates 430, 434, 434 and 436 connected to the outputs of the B argument register 220. The AND gates connected to the outputs of the registers are coincidence gates turned on by a 1-state in the register and the noncarry output of the BRM counter 440. The BRM counter 440 is driven by the BRM clock 224 which generates a train of pulses equal to the maximum count of the registers, here fifteen, upon receiving the timing pulse $T_1$. The output of the AND gates associated with the A argument register 218 are connected to the OR gate 450 which produces the A motor pulses, AMP, and the outputs of the AND gates associated with the B argument register 220 are connected to the OR gate 452 which produces the B motor pulses, BMP. Accordingly, the trains of A motor pulses from OR gate 450 have pulses equal in number to the digital count entered in the A argument register while the trains of B motor pulses from OR gate 452 have pulses equal in number to the digital count entered in the B argument register 220.

It should be noted at this point that the BRM clock 224 established the feed rate or speed of the carriages assuming that the carriage drive motors and amplifiers have commensurate capacities. In regard to the sewing system, the system parameters which determine the maximum feed rate are governed by the maximum speed of the sewing machine 14 since the actual movement or indexing of the carriages between stitching positions must be accomplished in an interval of time no longer than that for a single stitching cycle, or, with less yeilding materials which can bend the needle if moved by the carriages while the needle is engaged with them, in the interval of time in which the reciprocating needle 34 is withdrawn from the collar material. Knowing the maximum speed of the sewing machine establishes the shortest interval of time for movement and, correspondingly, the longest permissible cycle time of the BRM clock 224. As long as the drive motors are capable of moving the carriages within the longest permissible cycle time, the sewing machine can operate at any speed up to its maximum and the collar material will be moved with certainty by an amount equal to the length of a single stitch within the prescribed interval. It also follows that the cycle time of the clock 224 may be adjusted to be equal to the time for a stitching cycle so that motion is continuous, or the cycle time may be shortened so that motion is discontinuous, the dwell period being increased as the cycle time of the clock is decreased. The synchronization between the indexing motions of the partholder and the reciprocating motions of the sewing needle is assured by triggering the BRM clock 224 with the timing pulse $T_1$ derived from the sewing machine clock 204 (FIG. 11) and the phasing of the indexing motions and reciprocating motions is assured by appropriately mounting the timing pulse generator or commutator ring 146 and position pickup 154 on the sewing machine. It is, therefore, possible to design the carriage motor drive system so that it can move the collar C at the speed necessary for the maximum sewing machine speed, and all other sewing machine speeds will automatically be accomodated.

The motor pulse trains from OR gates 450 and 452 correspond respectively to the magnitudes or the A and B arguments. The pulse trains, therefore, must be identified with the correct coordinate axes, and the directions of the displacements along the respective axes must also be determined.

Figure 19:
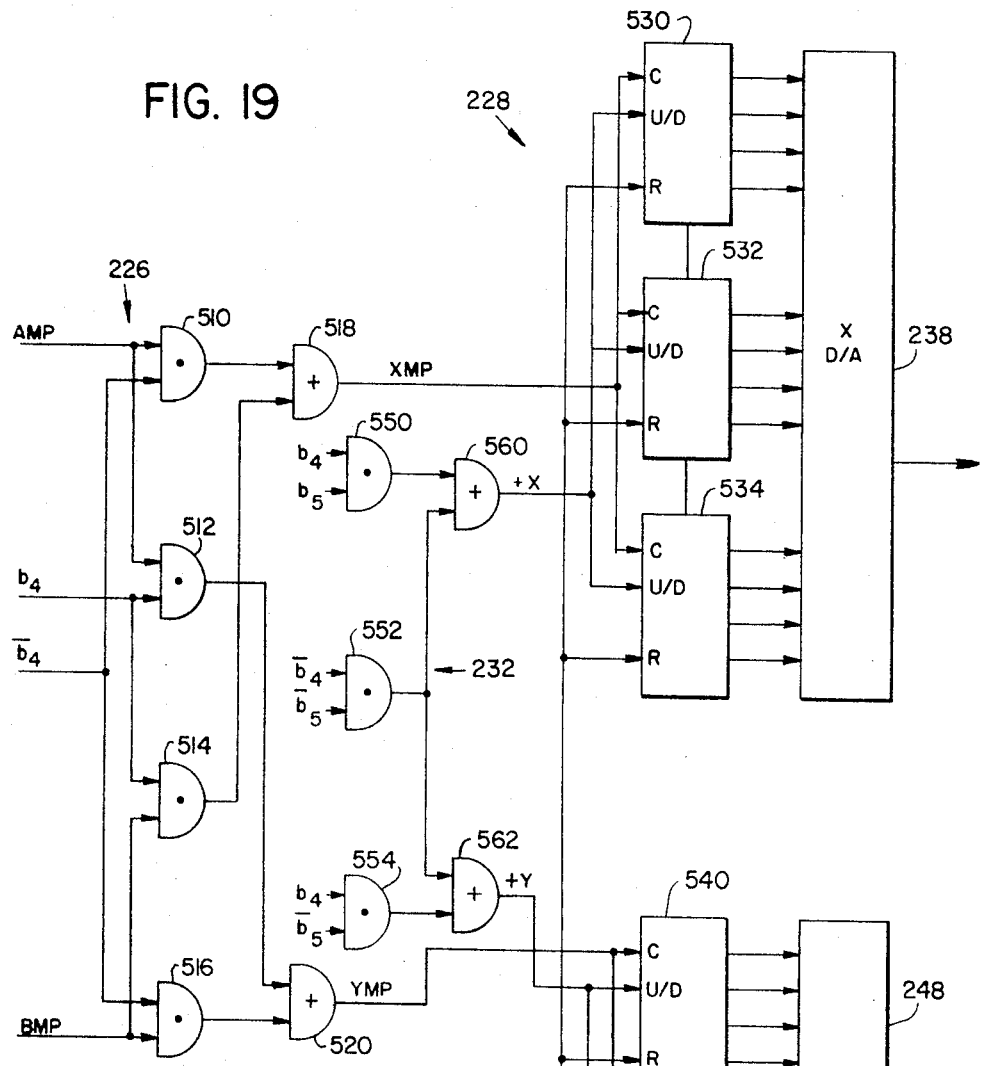
FIG. 19 is a diagram showing in detail another portion of the control computer of FIG. 9 which connects with the portion shown in FIG. 18 and further processes the vector displacement signals.

To identify the trains of motor pulses emanating from the OR gates 450 and 452 of the BRM 222 with the correct coordinate axes, the outputs of gates 450 and 452 are connected to the axis selector circuitry 226 shown in detail in FIG. 19. The A motor pulses are transmitted to the inputs of AND gates 510 and and 512 and the B motor pulses are transmitted to the inputs of AND gates 514 and 516. The outputs of gates 510 and 514 are connected to OR gate 518 which transmits trains of X motor pulses, XMP. Correspondingly, the outputs of gates 512 and 516 are connected to OR gate 520 which transmits trains of Y motor pulses, YMP. The AND gates 510, 512, 514, and 516 are selectively enabled by the information in track 4 of the memory tape to divert the A and B motor pulses respectively to the OR gates associated with the appropriate axis. As discussed above and shown in FIG. 14, the relationship of the A and B arguments and the X and Y coordinate axes is the same in quadrants I and III and a reciprocal relationship prevails in quadrants II and IV. A brief examination of the table in FIG. 15 reveals that the word bit in track 4 of the memory tape is a binary 0 for movements in quadrants I and III and a binary 1 for movements in quadrants II and IV. For this reason, the enabling signal for gates 510 and 516 is, in Boolean terminology, $\bar{b}_4$ while the enabling signal for gates 512 and 514 is $b_4$. The motor pulses at the outputs of OR gates 518 and 520 are, therefore, identified with the correct coordinate axis.

The output of OR gate 518 which transmits the X motor pulses is connected to the input of the absolute X counter 228 shown in FIG. 19 as a series of up/down decade counters 530, 532 and 534. The counters produce an absolute digital count equal to the total displacement of the X carriage 16 from an arbitrary reference such as the starting position of the X carriage at which the part holder 20 and the collar C are loaded onto the Y carriage 18. The outputs of the counters 530, 532, and 534 are connected to the X digital-to-analog converter 238 which converts the absolute count into an absolute analog voltage. As shown in FIG. 9, the analog voltage from the converter 238 is the input signal to the servo control loop for the drive motor 54 of the X carriage 16.

In a similar respect, the output of OR gate 520 which transmits the Y motor pulses is connected to the input of the absolute Y counter 230. The counter 230 is composed of a series of up/down decade counters 540, 542, and 544 which produce an absolute digital count representing the total displacement of the Y carriage 18 from the reference position at the beginning of a sewing operation. The outputs of the counters 540, 542, and 544 are connected to the Y digitial-to-analog converter 248 which produces an absolute analog voltage that drives the servo control loop for drive motor 88 as shown in FIG. 9. Although the counters 228 and 230 are shown as having the same number of decade counters and, therefore, the same count capacity, different capacities in the two command channels can be had where the total translations along the respective axes are not of the same order of magnitude by increasing the numbers of decade counters in the respective channels and making corresponding modifications in the digital-to analog-converters.

To translate the carriages 16 and 18 in the correct direction or with the correct sense along the coordinate axes, each of the decade counters 530, 532, 534, 540, 542, and 544 receives "up" and "down" commands from the sign decoder 232 also shown in detail in FIG. 19. The sign decoder is composed of the AND gates 550, 552, and 554 and the OR gates 560 and 562. Each of the AND gates receives information from tracks 4 and 5 of the memory tape as indicated in Boolean notation at the inputs of the gates. The significance of the inputs to the AND gates becomes more apparent upon a brief examination of decoding information shown in the table of FIG. 15 and the directional senses of the X and Y components in the different quadrants as shown in FIG. 14. FIG. 14 indicates that all vectors in the first quadrant have both positive X and Y components in conventional fashion. Vectors in the second quadrant have a negative X component and a positive Y component. In the third quadrant both components of the vectors are negative and in the fourth quadrant the vectors have a positive X component and a negative Y component. The digital information in tracks 4 and 5, according to the table in FIG. 15, reveals that the Boolean expression $b_4 b_5 + \bar{b}_4 \bar{b}_5$ identifies vectors in quadrants I and IV which have positive X components and the Boolean expression $b_4 \bar{b}_5 + \bar{b}_4 b_5$ identifies vectors in quadrants I and II which have positive Y components. The expression identifying positive X components is implemented in the logic of the AND gates 550 and 552 and the OR gate 560. The expression identifying positive Y components is implemented in the logic of the AND gates 552 and 554 and the OR gate 562. The output of OR gate 560 sets the decade counters 530, 532 and 534 to count up when the vector commands having positive X components are read from the memory tape and to count down when vector commands having a negative X component are read from the memory tape. Correspondingly, the output or OR gate 562 is connected to decade counters 540, 542 and 544 to cause the counters to count up when vector commands having positive Y components are read from the memory tape and to count down when commands having negative Y components are read from the memory tape. The analog voltages produced by the digital-to-analog converters 238 and 248 follow the absolute digital count of the counters 228 and 230 up and down so that the carriage drive motors 54 and 88 responding to the absolute analog voltage applied to the closed servo-control loop produce carriage motions having both positive and negative senses along the coordinate axes. The axis selector 226 and the sign decoder 232 together are effectively a quadrant decoder since they associate the motor pulse trains from the BRM 222 with the coordinate axes and with the proper sense of movement along the axes. The senses of movement along the two axes are, of course, perculiar to each quadrant defined by the axes.

In the preferred embodiment of the invention, the switch 314 (FIG. 11) or the $M_5$ command produces the clear signal CLR which resets the counters 228 and 230 to zero so that the carriages automatically return to the (0,0) or reference position. The position preset circuitry 236 (FIG. 9) is not shown in FIG. 19 for simplicity but is connected to each of the decade counters 530, 532, 534, 540, 542 and 544 and biases the absolute digital counts and the analog voltages of converters 238 and 248 so that upon resetting the digital counters, the carriages 16 and 18 return to the position preset by the circuitry 236. The reference position is preferably the starting position of the collar C at the beginning of a sewing operation, in which case, the preset circuitry 236 establishes the starting positions of the carriages 16 and 18 and the part holder 20 on the support table 24.

Figure 20:
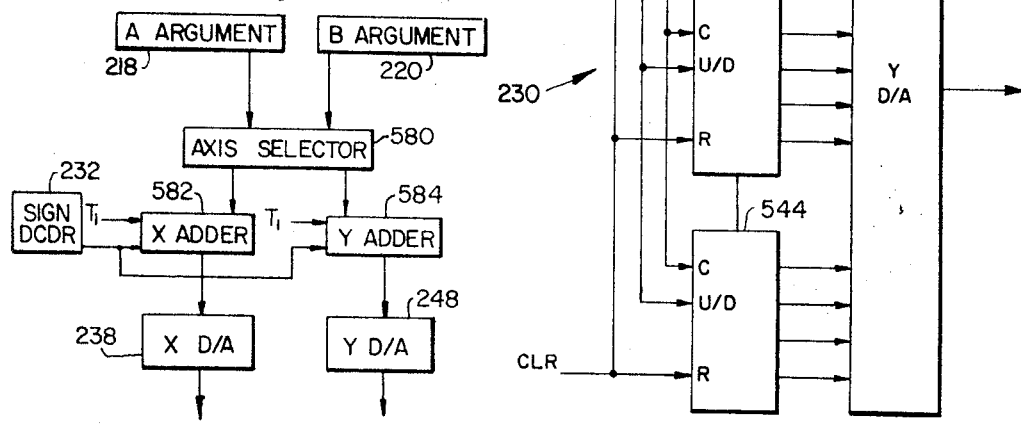
FIG. 20 is a block diagram of another embodiment of the sewing apparatus showing a portion of the digital motor controls.

FIG. 20 shows another preferred embodiment of the sewing apparatus having a digital motor controls which do not employ the BRM 222 or its clock 224. The BRM 222, when used, provides trains of pulses which are time-phased to set the average speed of the movements in the X and Y coordinate directions proportional to the magnitudes of the respective components of the displacements between stitching or work points on the work path. The composite relative movements, therefore, closely follow the actual slope of the path between work points. In the sewing apparatus and other machines which perform cyclic operations at discrete work points on a workpiece, it is not required that the indexing or relative movements of the article and work piece follow the sloped path between work points. The movements in each coordinate direction between discrete work points need only be executed between cyclic operations and the manner in which the movements are executed or the path followed between work points is not particularly important. Accordingly, it is possible to simply transfer the count representing the component magnitudes in the argument registers to the digital-to-analog converters by means of adders without generating the time-phased pulse trains to correlate the speeds of the displacements in the coordinate directions.

FIG. 20 is a block diagram similar to FIG. 9 showing only that portion of the digital motor controls between the argument registers 218 and 220 and the digital-to-analog converters 238 and 248. The remaining portion of the motor controls in this embodiment of the apparatus is the same as the embodiment shown in FIG. 9. The argument registers have outputs connected through an axis selector 580 to a parallel X adder 582 and a paralley Y adder 584. This axis selector 580 responds to the word bit in track 4 of the memory tape in the same manner as the axis selector 226 shown in FIG. 19 and connects the outputs of the arugment registers 218 and 220 to the respective inputs of the parallel adders. The adders 582 and 584 are connected to the sign decoder 232 and are responsive to the sign information to add or subtract the binary counts in the argument registers respectively to or from cumulative counts held in cummulating registers of the adders. The cumulative counts represent the total displacements of the X and Y carriages from the reference or starting position.

The adders also receive the timing pulse $T_1$ from the control logic circuitry 200 so that the adding operation is synchronized with the tape reading operation which sets new counts in the argument registers during each stitching cycle of the sewing machine 14. The cumulative counts in the adders are the inputs to the digital-to-analog converters 238 and 248, therefore, a step change in the analog voltage can occur following each adding operation. The X and Y drive motors responding to the analog voltages move the X and Y carriages to index the sewing needle to a new stitching point on the stitch path during or within the period of the needle reciprocation but without following the slope of the stitch path between successive stitching points since the speeds of the displacements along the X and Y coordinate directions are not correlated by a common time base such as that provided by the BRM 222 in FIG. 18. Nevertheless, the displacements between stitch points are executed during the stitching cycles and the sewing routine is carried out in basically the same manner as that resulting from the slope-related displacements provided by the BRM 222.

It is thus seen that the numerical control system described in several embodiments above provides digital information and executes the discrete movements of the needle and carriages relative to one another during an interval of each stitching cycle and preferably while the needle is withdrawn from the article being sewn. The digital information defining a discrete movement is recorded in a single tape frame, hence the tape reader 190 need be advanced only one tape frame for each stitching cycle and the digital information in that frame is processed through the digital motor control circuitry for the drive motors of the carriages 16 and 18 in a brief period of time.

While the present invention has been described in several preferred embodiments, it should be readily understood that there still numerous other modifications and substitutions which can be had without departing from the spirit of the invention. For example, although an analog servo-system is utilized to operate the drive motors 54 and 88, it is readily apparent that the pulse trains from the axis selector 226 and the sign information from sign decoder 232 could be utilized in a digital control system employing step motors to move the carriages 16 and 18. The program of M-functions and vector displacements can, of course, be varied according to the pattern to be followed on a workpiece and the operations of the machine tools employed. Accordingly, the present invention has been described in several embodiments merely by way of illustration rather than limitation.

We claim:

1. The method of translating an article and a tool relative to one another in a given plane defined by two coordinate axes comprising storing in a data memory coded information defining the desired movements of the object and tool relative to one another in terms of a finite number of vectorial displacements, the displacements being unique among themselves only in any given quadrant defined by the coordinate directions, said movements are desired; reading the coded information in the data memory; resolving a portion of said coded information defining one of the vectorial displacements simultaneously into first and second sets of signals representing respectively the magnitudes of the components of the one of the vectorial displacements in each of the coordinate directions without regard to the quadrant in which a movement is desired; decoding another portion of said coded information defining the quadrant in which the movement is desired into a third set of signals identified with the quadrant; combining said first and second set of signals with said third set of signals to produce a fourth set of signals for controlling the desired movement of the article and tool relative to one another in each of the coordinate directions; and translating the article and tool relative to one another simultaneously in each of the coordinate directions in accordance with the fourth set of signals.

2. A method of translating as defined in claim 1 wherein said step of resolving comprises producing trains of pulses, each train containing a number of pulses proportional to the magnitude of a component of a desired movement of the article and tool in one coordinate direction.

3. A method of translating as defined in claim 2 wherein the step of decoding comprises producing in said third set, signals relating said trains of pulses with corresponding coordinate directions and senses along said corresponding coordinate directions.

4. The method of translating as defined in claim 1 wherein the step of storing comprises programming a multitrack memory tape with the coded information, the information identifying a vectorial displacement and an associated quadrant being positioned in a single tape frame.

5. The method of translating an article and a tool relative to one another in a plane defined by X and Y coordinate axes, said method comprising the steps of establishing a set of vector displacements greater than eight by which said object and tool may move relative to one another from any starting point, each of said vector displacements being defined by a whole number of unit displacements along the X axis and a whole number of unit displacements along the Y axis; assigning to each of said vector displacements a unique binary coded word; resolving a desired path of travel of said tool relative to said object into a number of consecutive vector displacements each selected from said established set of vector displacements; recording said consecutive vector displacements on a memory element in consecutive order in a form of the binary coded words assigned to said vector displacements; retrieving said binary coded words from said memory element in consecutive order and decoding each one into two signals representing respectively the whole number of unit displacements along the X axis and the whole number of unit displacements along the Y axis defining the vector displacements represented by such binary coded work; and consecutively applying each set of the latter two signals so produced to motive means responsive thereto to simultaneously move said tool relative to said article along said X and Y axes respectively by displacements directly related to the number of unit displacements represented by each of said latter two signals.

6. An automated sewing machine comprising a machine frame; stitching means including a reciprocating sewing needle for generating sewing stitches in an article to be sewn; holding means for holding the article to be sewn during a stitching operation; an electromagnetic chuck having mounting surfaces mating with the holding means at a preselected mounting position of the holding means on the chuck; movable carriage means mounted to the machine frame and interposed between the stitching means and the chuck for moving the stitching means and the chuck relative to one another to produce relative movement between the sewing needle and the holding means mounted in the preselected mounting position on the chuck; controlled motor means connected to the carriage means to move the carriage means and produce a prescribed relative movement between the holding means and the reciprocating sewing needle, the prescribed relative movement causing the reciprocating sewing needle to traverse a given stitching path over an article held in the holding means in the preselected mounting position on the chuck; and a switch mounted on the electromagnetic chuck and actuated by the holding means in the preselected mounting position on the chuck, the switch being electrically connected with the controlled motor means to prevent starting of the motor means before the switch is actuated by the holding means in the preselected mounting position.

7. An automated sewing machine as defined in claim 6 wherein the holding means in the preselected mounting position has an electromagnetically permeable portion seized by and overlying the electromagnetic chuck and a holding portion for articles to be sewn projecting in cantilever fashion from the chuck.

8. An automated sewing machine as defined in claim 7 wherein the holding portion includes a hinged clamp having a peripheral contour along at least one side exposing the articles to be sewn.

9. An automated sewing machine as defined in claim 7 wherein the holding portion is adjustable to receive articles to be sewn along different stitch paths.

10. An automated sewing machine as defined in claim 6 wherein: the stitching means is mounted to the frame and the movable carriage means includes a pair of guide rails extending parallel to a direction generally perpendicular to the reciprocating needle and a carriage translatable on the pair of guide rails relative to the needle and the frame; and wherein: the electromagnetic chuck is mounted to the translatable carriage, and the holding means mounted in the preselected position on the chuck has one portion overlying the chuck and another portion projecting from the translatable carriage in a direction generally perpendicular to the needle.

11. An automated sewing machine as defined in claim wherein the projecting portion of the holding means comprises a clamping portion in which the articles to be sewn are held in a spread condition.

12. In apparatus for controlling movements of an object and tool relative to one another between spaced work points on a path lying in a plane defined by two coordinate axes, the improvement comprising: a data memory containing coded information defining desired movements of the object and tool relative to one another between adjacent work points on the path in terms of a finite number of vectorial displacements; first decoding means connected to the data memory for identifying the vectorial displacements recorded in the coded information; argument selecting means responsive to the decoding means for resolving the identified displacements into predefined arguments representing the magnitudes of the two components of the identified vectorial displacements along the two coordinate axes without specific identification with either one of the coordinate axes; second decoding means connected to the data memory for associating the arguments respectively with the coordinate axes and with the appropriate senses in accordance with the vectorial displacements recorded in the coded information to produce motor drive signals defining the desired movements.

13. In an apparatus for controlling, the improvement defined in claim 12 wherein the second decoding means comprises an axis selector circuit responsive to the data memory and comprising a gating circuit having two inputs connected to the argument selecting means and two outputs associated respectively with the two coordinate axes.

14. In an apparatus for controlling, the improvement defined in claim 13 wherein the second decoding means further comprises a sign decoder responsive to the data memory and having two outputs associated respectively with the two coordinate axes.

15. In an apparatus for controlling, the improvement defined in claim 13 wherein the argument selecting means comprises two digital registers associated respectively with the two components of the vectorial displacements; and wherein a binary rate multiplier is interposed between the two digital registers and the two inputs of the axis selector circuit to supply to the selector two trains of time-phased pulses.

16. In an apparatus for controlling, the improvement defined in claim 13 wherein the argument selecting means comprises two registers associated respectively with the two components of the vectorial displacements; and two parallel adders are serially connected with the axis selector and the two registers.

17. A method of translating an article and a tool relative to one another to cause the tool to move between work points on a given path on the article comprising; sequentially producing groups of coded signals, each group being representative of a vector defining movement of the article and tool relative to one another between work points, the vectors taken sequentially in the order of the groups defining the given path; decoding portions of the groups of signals to identify the vectors represented; resolving the identified vectors into predefined arguments representing the magnitudes of the components of the identified vectors along two coordinate axes in a plane in which the path lies without associating the arguments respectively with the two coordinate axes; subsequently associating the arguments respectively with the coordinate axes and with the appropriate senses in accordance with the vectors as defined in the coded information to produce motor drive signals for each coordinate axis, and driving the article and tool relative to one another simultaneously along each coorginate axis in accordance with the motor drive signals to execute the desired relative movements of the article and tool between work points on the path.

18. A method of translating an article and tool as defined in claim 17 including the additional steps of generating from the arguments trains of pulses respectively proportional in number to the magnitudes of the components of the identified vectors; and the step of driving comprises driving the article and tool relative to one another along the respective coordinate axis in accordance with the pulse trains.

19. A method of translating an article and tool relative to one another as defined in claim 17 in which method the tool is a cyclically operated tool wherein the step of decoding is synchronized with the cyclic operation of the tool and comprises decoding one group of signals for each cycle of operation of the tool.

20. The method of translating as defined in claim 19 wherein the step of producing comprises providing a memory tape containing coded information completely identifying a vector in each tape frame and reading the frames of the memory tape in synchronism with the cyclic operation of the tool, one frame being read during each cycle of operation.

21. Apparatus for translating relative to one another an article and a sewing tool which performs a cyclic stitching operation on the article comprising: pattern signal generating means for producing a sequence of displacement signals defining a corresponding sequence of displacements of the article and sewing tool relative to one another, the sequence of discrete displacements describing a stitching path on the article to be followed by the tool; a digital register connected to the pattern signal generating means to sequentially receive for temporary storage the displacement signals from the pattern generating means; timing signal generating means for sensing the cyclic operation of the sewing tool and producing timing signals synchronously with the cyclic operation of the tool; control means including a binary rate multiplier connected to the digital register and the timing signal generating means for periodically releasing in synchronism with the cyclic operation of the sewing tool a train of time-phased motor pulses corresponding in number to the displacement signal in the digital register; and motor means connected to the control means for moving the article and sewing tool relative to one another in accordance with the train of time-phased pulses.

22. Apparatus for translating an article and sewing tool relative to one another as defined in claim 21 wherein the binary rate multiplier includes a signal-controlled clock having a selected counting rate and connected to the timing signal generating means for actuation by the timing signal.

23. Apparatus for translating an article and tool as defined in claim 21 wherein the pattern signal generating means includes a memory tape and a signal-controlled tape reader associated with the tape and connected to the timing signal generating means for synchronous operation with the cyclically operated sewing tool.

24. Apparatus for translating as defined in claim 23 wherein the timing signal generating means comprises a sending unit connected with the sewing tool and producing a timing pulse for each stitching cycle of the tool; and the tape reader is responsive to the timing pulse to advance the memory tape by a single frame for each timing pulse.

25. An improvement as defined in claim 12 wherein said data memory includes a multitrack memory tape having the coded information completely defining a vectorial displacement contained within a single frame of said tape.

* * * * *